United States Patent
Hocke et al.

(10) Patent No.: US 12,447,699 B2
(45) Date of Patent: Oct. 21, 2025

(54) ANISOTROPIC COMPOSITE MATERIALS BASED ON POLYISOCYANATES

(71) Applicant: Covestro Deutschland AG, Leverkusen (DE)

(72) Inventors: Heiko Hocke, Shanghai (CN); Andrea Koether, Kürten (DE); Dirk Achten, Leverkusen (DE); Dieter Aderjahn, Köln-Flittard (DE); Bianca Rexmann, Leverkusen (DE); Nicole Reidenbach, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 909 days.

(21) Appl. No.: 16/334,051

(22) PCT Filed: Sep. 15, 2017

(86) PCT No.: PCT/EP2017/073276
§ 371 (c)(1),
(2) Date: Mar. 18, 2019

(87) PCT Pub. No.: WO2018/054776
PCT Pub. Date: Mar. 29, 2018

(65) Prior Publication Data
US 2019/0255788 A1  Aug. 22, 2019

(30) Foreign Application Priority Data
Sep. 20, 2016 (EP) .................................. 16189653

(51) Int. Cl.
*B29C 70/52* (2006.01)
*C08G 18/48* (2006.01)
*C08G 18/79* (2006.01)
*C08J 5/04* (2006.01)
*B29K 275/00* (2006.01)

(52) U.S. Cl.
CPC .......... *B29C 70/52* (2013.01); *C08G 18/4833* (2013.01); *C08G 18/792* (2013.01); *C08J 5/0405* (2021.05); *C08J 5/043* (2013.01); B29K 2275/00 (2013.01); B29K 2995/0044 (2013.01); C08J 2375/00 (2013.01)

(58) Field of Classification Search
CPC ........................ C08G 18/725; C08G 18/798; C08G 18/4833; B29C 70/52
See application file for complete search history.

(56) References Cited

U.S. PATENT DOCUMENTS

| | | | |
|---|---|---|---|
| 3,211,703 A | 10/1965 | Gilman et al. | |
| 3,330,828 A | 7/1967 | Grogler et al. | |
| 3,996,223 A | 12/1976 | Gupta et al. | |
| 4,255,569 A | 3/1981 | Müller et al. | |
| 4,379,905 A | 4/1983 | Stemmler et al. | |
| 4,385,171 A * | 5/1983 | Schnabel | C08G 18/10 560/115 |
| 4,540,781 A | 9/1985 | Barsa | |
| 4,604,418 A | 8/1986 | Shindo et al. | |
| 4,748,242 A * | 5/1988 | Halpaap | C08G 18/792 544/193 |
| 4,837,359 A | 6/1989 | Woynar et al. | |
| 4,960,848 A | 10/1990 | Scholl et al. | |
| 4,994,541 A | 2/1991 | Dell et al. | |
| 5,064,960 A | 11/1991 | Pedain et al. | |
| 5,076,958 A | 12/1991 | Pedain et al. | |
| 5,079,327 A * | 1/1992 | Sarpeshkar | C08G 18/792 528/53 |
| 5,338,479 A * | 8/1994 | Panandiker | C08G 18/725 252/183.11 |
| 5,387,367 A * | 2/1995 | Haeberle | C08G 18/706 252/182.2 |
| 5,534,302 A * | 7/1996 | Ma | C08J 5/04 525/399 |
| 5,770,673 A * | 6/1998 | Markusch | C08G 18/2865 525/410 |
| 5,914,383 A | 6/1999 | Richter et al. | |
| 5,977,283 A * | 11/1999 | Rossitto | C09J 175/06 528/80 |
| 6,031,013 A * | 2/2000 | Scherzer | C08G 18/4812 521/170 |
| 6,191,179 B1 * | 2/2001 | Scherzer | C08G 18/771 521/174 |
| 10,029,427 B2 | 7/2018 | Schmidt et al. | |
| 2001/0029272 A1* | 10/2001 | Schwalm | C09D 175/16 522/78 |

(Continued)

FOREIGN PATENT DOCUMENTS

| | | | |
|---|---|---|---|
| DE | 1954093 A1 | 6/1970 | |
| DE | 1670666 A1 | 7/1971 | |
| DE | 2414413 A1 | 10/1975 | |
| DE | 2452532 A1 | 5/1976 | |
| DE | 2641380 A1 | 3/1978 | |
| DE | 3100263 A1 | 8/1982 | |
| DE | 3219608 A1 | 9/1983 | |
| DE | 3240613 A1 | 5/1984 | |
| DE | 3700209 A1 | 7/1988 | |
| DE | 3900053 A1 | 7/1990 | |
| DE | 3928503 A1 | 3/1991 | |

(Continued)

OTHER PUBLICATIONS

Dube et al., "Reaction Injection Pultrusion of Thermoplastic and Thermoset Composites", Polymer Composites, vol. 16, No. 5, Oct. 1995, pp. 378-385.

(Continued)

*Primary Examiner* — Andrew D Graham
(74) *Attorney, Agent, or Firm* — The Webb Law Firm

(57) ABSTRACT

The present invention relates to novel anisotropic composite materials and processes for production thereof. The composite materials are based on the crosslinking of polyisocyanates and feature good weathering stability.

14 Claims, No Drawings

(56) References Cited

U.S. PATENT DOCUMENTS

| | | | | |
|---|---|---|---|---|
| 2002/0032297 A1* | 3/2002 | Carlson | C08G 18/792 | 528/44 |
| 2002/0045690 A1* | 4/2002 | Cheolas | C08G 18/6674 | 524/217 |
| 2003/0207956 A1* | 11/2003 | Balch | C08F 283/006 | 522/104 |
| 2003/0220445 A1* | 11/2003 | Mayer | C08G 18/10 | 524/589 |
| 2004/0077238 A1* | 4/2004 | Audenaert | C08G 18/2825 | 252/8.62 |
| 2004/0094859 A1* | 5/2004 | Cheolas | C08G 18/4841 | 524/217 |
| 2004/0197481 A1* | 10/2004 | Whitman | C08G 18/622 | 528/80 |
| 2006/0247371 A1* | 11/2006 | Mundstock | C08G 18/775 | 524/589 |
| 2007/0149747 A1* | 6/2007 | Rukavina | B32B 27/40 | 528/44 |
| 2009/0240004 A1* | 9/2009 | Maier | C09D 175/04 | 525/457 |
| 2009/0281268 A1* | 11/2009 | Rukavina | B32B 17/1077 | 528/60 |
| 2010/0124649 A1* | 5/2010 | Rukavina | B32B 9/005 | 428/292.1 |
| 2010/0209714 A1* | 8/2010 | Costa | C08G 18/4833 | 252/182.14 |
| 2011/0184080 A1* | 7/2011 | Schonberger | C08G 18/73 | 521/90 |
| 2011/0281965 A1* | 11/2011 | Laas | C08G 18/792 | 521/137 |
| 2011/0313091 A1* | 12/2011 | Argyropoulos | C09D 175/04 | 524/391 |
| 2012/0003890 A1* | 1/2012 | Schmidt | C08G 18/1875 | 428/221 |
| 2012/0003891 A1* | 1/2012 | Schmidt | B29C 70/506 | 427/180 |
| 2012/0012251 A1* | 1/2012 | Burckhardt | C08G 18/798 | 156/331.7 |
| 2012/0165469 A1* | 6/2012 | Michalewich | C08G 18/10 | 525/128 |
| 2013/0045652 A1* | 2/2013 | Schmidt | C08G 18/798 | 442/179 |
| 2013/0078417 A1* | 3/2013 | Schmidt | B32B 3/146 | 428/116 |
| 2013/0095331 A1* | 4/2013 | Ludewig | C08G 18/672 | 524/590 |
| 2013/0184367 A1* | 7/2013 | Meyer Zu Berstenhorst | C08G 18/6688 | 521/159 |
| 2013/0303042 A1* | 11/2013 | Schmidt | D06N 3/147 | 427/389.9 |
| 2013/0309924 A1 | 11/2013 | Wegener et al. | | |
| 2014/0031484 A1* | 1/2014 | Kobata | C08G 18/6254 | 528/45 |
| 2014/0087613 A1* | 3/2014 | Spyrou | C08K 5/315 | 524/590 |
| 2014/0135468 A1* | 5/2014 | Freeman | C09D 175/08 | 528/67 |
| 2014/0265000 A1* | 9/2014 | Magnotta | C08G 18/482 | 528/85 |
| 2014/0275345 A1* | 9/2014 | Williams | C08L 37/00 | 525/286 |
| 2015/0031527 A1* | 1/2015 | Esbelin | C08G 18/7671 | 252/182.29 |
| 2015/0291840 A1* | 10/2015 | Schrinner | C08G 18/44 | 524/839 |
| 2016/0039968 A1* | 2/2016 | Rukavina | C08G 18/725 | 428/221 |

FOREIGN PATENT DOCUMENTS

| | | |
|---|---|---|
| DE | 102010030233 A1 | 12/2011 |
| DE | 102010041247 A1 | 3/2012 |
| EP | 0056159 B1 | 2/1986 |
| EP | 0336205 A2 | 10/1989 |
| EP | 0339396 A1 | 11/1989 |
| EP | 0798299 A1 | 10/1997 |
| EP | 2777915 A1 | 9/2014 |
| GB | 809809 A | 3/1959 |
| GB | 952931 A | 3/1964 |
| GB | 966338 A | 8/1964 |
| GB | 1145952 A | 3/1969 |
| GB | 1244416 A | 9/1971 |
| GB | 1335958 A | 10/1973 |
| GB | 1386399 A | 3/1975 |
| GB | 1391066 A | 4/1975 |
| GB | 2221465 A | 2/1990 |
| GB | 2222161 A | 2/1990 |
| WO | WO-0029459 A1 | 5/2000 |
| WO | WO-0216482 A2 | 2/2002 |
| WO | WO-2012101085 A1 | 8/2012 |

OTHER PUBLICATIONS

International Search Report for PCT/EP2017/073276 mailed Nov. 20, 2017.

Written Opinion of the International Searching Authority for PCT/EP2017/073276 mailed Nov. 20, 2017.

\* cited by examiner

ANISOTROPIC COMPOSITE MATERIALS BASED ON POLYISOCYANATES

CROSS-REFERENCE TO RELATED APPLICATIONS

This application is a national stage application (under 35 U.S.C. § 371) of PCT/EP2017/073276, filed Sep. 15, 2017, which claims benefit of European Application No. 16189653.5, filed Sep. 20, 2016, both of which are incorporated herein by reference in their entirety.

The present invention relates to novel anisotropic composite materials and processes for production thereof. The composite materials are based on the crosslinking of polyisocyanates and feature good weathering stability and a simple production process.

Typically, polymeric matrix materials used for fibre-reinforced composite materials are unsaturated polyester (UP) and polyvinyl (VP) resins, epoxides, methyl methacrylate, caprolactam, caprolactone and, as of recently, also aromatic polyurethane (PU) systems. These known polymeric matrix materials have the disadvantage of inadequate weathering resistance in the composite material, and therefore typically have to be painted with weathering-resistant paint when used outdoors. Such a painting operation is associated with considerable complexity and costs in some cases, since the weathering-resistant paint layer often adheres only poorly on the surface of the fibre-reinforced composite material, especially when separating agents have been used in the production of the component. Moreover, maintenance of the components is necessary in order to eliminate possible sites of damage in the protective layer and hence prevent attack on the underlying composite material. The provision of composite materials with good intrinsic weathering stability is therefore desirable.

Polymers with polyisocyanurate structure components are basically known for their good thermal stability and chemical resistance. Particularly polyisocyanurates based on aliphatic isocyanates additionally have very good weathering stability. However, the complete trimerization of diisocyanates to give polyisocyanurate plastics is difficult to monitor. For this reason, aliphatic polyisocyanurates have to date typically only found practical use as crosslinking agents for polyurethane systems in paint and adhesive chemistry, the production of which involves stopping the trimerization reaction at low conversions and removing excess unreacted monomeric diisocyanate. Thus, DE 31 00 263; GB 952 931, GB 966 338; US 3 211 703, US 3 330 828, EP 0 056 159 B1 and DE 32 19 608 A1 envisage conducting the reaction either in dilution or only up to low conversion values with very precise temperature control in the production of crosslinking agents based on polyisocyanurates proceeding from aliphatic and mixed aliphatic and aromatic monomeric diisocyanates. There is specifically no formation here of fully crosslinked polyisocyanurate plastics, only formation of oligomeric, soluble products of low viscosity.

The thesis by Theo Flipsen: "Design, synthesis and properties of new materials based on densely crosslinked polymers for polymer optical fibre and amplifier applications", Rijksuniversiteit Groningen, 2000 describes the trimerization of monomeric HDI with a neodymium/crown ether complex as catalyst. The polyisocyanurate obtained, which is said to have good optical, thermal and mechanical properties, was examined in the context of the thesis for its suitability for optical applications, especially as polymeric optical fibre. According to Flipsen, only under ideal conditions with a soluble neodymium crown ether catalyst and with a preliminary reaction at 60° C. or room temperature and subsequent reaction at temperatures of up to 140° C. are high-transparency polyisocyanurates having a glass transition temperature (Tg) of 140° C. obtained over a long period of greater than 24 h. A disadvantage of the process described is that it is a slow multistage process with a complicated reaction regime that cannot be implemented in the pultrusion method. Moreover, the neodymium/crown ether complex used as catalyst is very costly and therefore uneconomic for use in an industrial scale process.

European Polymer Journal, vol. 16, 147-148 (1980) describes the very slow catalytic trimerization of monomeric diisocyanates at low temperatures of 40° C. to give a clear transparent polyisocyanurate plastic. For this purpose, however, very high catalyst concentrations of dibutyltin dimethoxide (about 10% by weight) as trimerization catalyst are required, and these have a severe adverse effect on the thermal stability and colour stability of the products. The glass transition temperature (Tg) and the thermal heat resistance were not examined. The content of free isocyanate groups within the solid material was not determined. Only the tensile shear strength at room temperature was determined, and showed relatively low values. Other diisocyanates such as IPDI, TDI or MDI did not give solids. The long reaction times of at least 18 hours described therein are disadvantageous in practical application and prevent the use of these materials especially in continuous manufacturing processes as characteristic, for example, of pultrusion. The situation is similar in respect of the process described in European Polymer Journal, vol. 14, 675-678 (1978).

GB 1 335 958 describes the production of a composite polyisocyanurate material by impregnating glass fibre weave with a 2:1 mixture of methylene diphenyl isocyanate (MDI) and trimethylhexamethylenediamine (TMHDI) in the presence of a benzyldimethylamine/phenyl glycidyl ether mixture as catalyst. The polyisocyanurate plastic was cured by means of a complicated temperature regime over a long period of 16 h at 50° C., 1 h at 100° C., 1 h at 150° C. and 3 h at 180° C. The process described takes several hours and cannot be implemented for pultrusion because of the complicated reaction regime.

Cheolas et al. in patent WO 00/29459 describe polyisocyanurate systems and the processing thereof by means of pultrusion in order to obtain reinforced composite materials with a polyisocyanurate matrix. The polyisocyanate systems used include a polyol component, optionally a chain extender and the isocyanate. In the crosslinking step, both urethane and isocyanurate formation are then catalysed, such that there is a mixture of urethane and isocyanurate groups in the finished material. The systems are based on exclusively aromatic isocyanates, which are known not to be stable to weathering and to break down under UV radiation. Moreover, the polyol component included polyether components that are likewise not weathering-stable. The pot lives at room temperature were only 5 to 30 min, which makes it impossible to use open dipping baths for the impregnation of the fibres and necessitates the use of an injection box.

Joshi et al. in WO 02716482 A2 describe an aromatic polyurethane-based, fibre-reinforced composite material which has been produced by pultrusion using an open dipping bath and by means of trimerization as crosslinking reaction. For performance of the process, the catalyst has to remain separated from the actually reactive resin phase for a sufficiently long period and has to be added only at a defined juncture in order to trigger the crosslinking reaction. This was achieved via supply of the catalyst separately from the resin by means of a spraying process onto the resin-impregnated fibre. Excess catalyst (and resin) is then stripped off before the material reaches the heated zone in the metal block and cures. There was no mention of customary recycling of the excess catalyst or catalyst/resin mixture that has been stripped off. The advantages of use of an open dipping bath were thus partly eliminated by the complex catalyst supply, the resultant elevated apparatus complexity and material consumption, and the increased volume of waste. Moreover, the finished composite material, owing to its aromatic polyurethane matrix, is likewise unsuitable for outdoor use without further treatment.

Magnotta and Harasin in EP 2777915 A1 describe an aliphatic polyurethane-based, fibre-reinforced composite material which has been produced by pultrusion and features good weathering properties and excellent mechanical values. Here too, however, the weathering properties in particular are improved by adding corresponding additives such as Tinuvin B 75. No assessment of the pure aliphatic polyurethane matrix is possible since no measurements were given therefor. Various polyether polyols and aliphatic polyisocyanates were used, but only the rigid systems based on isophorone diisocyanate and dicyclohexylmethane 4,4'-diisocyanate achieved high Tg values of practical relevance. Moreover, because of the reaction characteristics, the short pot life and the use of monomer-containing isocyanates, it was necessary to work with an injection box, which means additional apparatus complexity and financial outlay.

The problem addressed by the present invention was thus that of providing processes and materials which allow the production of composite materials based on aliphatic polyisocyanates. The reaction mixtures should feature sufficiently long pot lives with a simultaneously rapid reaction rate in the crosslinking process, in order to enable problem-free use in continuous production processes for composite materials, for example by pultrusion. The resulting composite materials, even without additional coating or the use of specific additives, should be notable for high weathering stability. This problem is solved by the embodiments that are defined in the claims and in the description.

In a first embodiment, the present invention relates to a pultrusion process for provision of a composite material, comprising the steps of
a) providing a reactive resin mixture comprising at least one polyisocyanate composition A and at least one crosslinking catalyst B,
b) providing a fibrous filler C, the fibres of which have an aspect ratio of at least 1000,
c) wetting the fibrous filler C with the reactive resin mixture from process step a), and
d) curing the reactive resin mixture by means of one or more chemical reactions, wherein at least 50% of the free isocyanate groups in the polyisocyanate composition A are crosslinked to give at least one structure selected from the group consisting of uretdione, isocyanurate, biuret, iminooxadiazinedione and oxadiazinetrione structures.

The term "composite material" is well known to the person skilled in the art. Composite materials are characterized in that they consist of at least two different materials having different material properties. The present case concerns a fibre composite material consisting essentially of a matrix formed from the polyisocyanate composition A and the fibrous filler C. "Essentially" in this context means that other components may be present, but do not exceed a proportion by volume of 25%.

The "reactive resin mixture" comprises all compounds which are capable of reacting with each other by forming uretdione, isocyanurate, biuret, iminooxadiazinedione, urethane, allophanate and oxadiazinetrione structures. Particularly it comprises all compounds with free isocyanate, hydroxyl, amino and thiol groups.

Polyisocyanate Composition A

The term "polyisocyanate" as used here is a collective term for compounds containing two or more isocyanate groups in the molecule (this is understood by the person skilled in the art to mean free isocyanate groups of the general structure —N═C═O). The simplest and most important representatives of these polyisocyanates are the diisocyanates. These have the general structure O═C═N—R—N═C═O where R typically represents aliphatic, alicyclic and/or aromatic radicals.

Because of the polyfunctionality (≥2 isocyanate groups), it is possible to use polyisocyanates to prepare a multitude of polymers (e.g. polyurethanes, polyureas and polyisocyanurates) and low molecular weight compounds (for example urethane prepolymers or those having uretdione, isocyanurate, allophanate, biuret, iminooxadiazinedione and/or oxadiazinetrione structure).

Where reference is generally made here to "polyisocyanates", this means monomeric and/or oligomeric polyisocyanates. For understanding of many aspects of the invention, however, it is important to distinguish between monomeric diisocyanates and oligomeric polyisocyanates. Where reference is made here to "oligomeric polyisocyanates", this means polyisocyanates formed from at least two monomeric diisocyanate molecules, i.e. compounds that constitute or contain a reaction product formed from at least two monomeric diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, biuret, iminooxadiazinedione and/or oxadiazinetrione structure. Especially when catalyst solvents that contain hydroxyl groups are being used, the oligomeric polyisocyanates that are suitable in accordance with the invention also contain urethane and allophanate structures. However, it is preferable that allophanate and urethane structures make up only a small proportion of the total amount of structures that bring about the oligomerization.

For example, hexamethylene diisocyanate (HDI) is a "monomeric diisocyanate" since it contains two isocyanate groups and is not a reaction product of at least two polyisocyanate molecules:

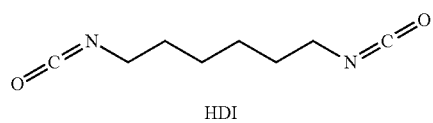

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

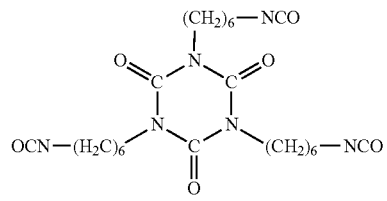
HDI isocyanurate

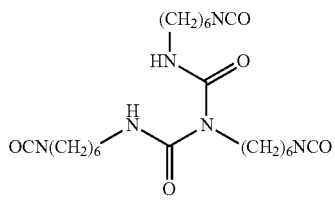
HDI biuret (idealized structural formulae)

"Polyisocyanate composition A" in the context of the invention refers to the isocyanate component in the initial reaction mixture. In other words, this is the sum total of all compounds in the initial reaction mixture that have isocyanate groups. The polyisocyanate composition A is thus used as reactant in the process according to the invention. When reference is made here to "polyisocyanate composition A", especially to "providing the polyisocyanate composition A", this means that the polyisocyanate composition A exists and is used as reactant.

In principle, the polyisocyanate composition A may contain monomeric and oligomeric polyisocyanates as individual components or in any mixing ratio.

Since oligomeric polyisocyanates, however, are less volatile than monomeric polyisocyanates, it may be desirable for reasons of occupational safety to reduce the proportion of monomeric polyisocyanates in the polyisocyanate composition A as far as possible. For that reason, the polyisocyanate composition A, in a preferred embodiment of the present invention, comprises oligomeric polyisocyanates and is low in monomeric diisocyanates, "low in monomeric diisocyanates" meaning that the polyisocyanate composition A has a content of monomeric diisocyanates of not more than 20% by weight.

"Low in monomers" and "low in monomeric polyisocyanates" is used here synonymously in relation to the polyisocyanate composition A.

In one embodiment of the invention, the polyisocyanate composition A consists entirely or to an extent of at least 80%, 85%, 90%, 95%, 98%, 99% or 99.5% by weight, based in each case on the weight of the polyisocyanate composition A, of oligomeric polyisocyanates. Preferably, the polyisocyanate composition A consists entirely or to an extent of at least 99.7%, 99.8% or 99.9% by weight, based in each case on the weight of the polyisocyanate composition A, of oligomeric polyisocyanates. This content of oligomeric polyisocyanates is based on the polyisocyanate composition A, meaning that they are not formed, for instance, as intermediate during the process according to the invention, but are already present in the polyisocyanate composition A used as reactant on commencement of the reaction.

The polyisocyanate composition A used is low in monomers. In practice, this can especially be achieved by using, as polyisocyanate composition A, oligomeric polyisocyanates, in the preparation of which the actual modification reaction has been followed in each case by at least one further process step for removal of the unconverted excess monomeric polyisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In one embodiment of the invention, the polyisocyanate composition A according to the invention is obtained by modifying monomeric polyisocyanates with subsequent removal of unconverted monomers.

In one embodiment of the invention, the polyisocyanate composition A comprises oligomeric polyisocyanates and includes not more than 20%, 15%, 10%, 5%, 4%, 3%, 2%, 1% or 0.5% by weight, based in each case on the weight of the polyisocyanate composition A, of monomeric polyisocyanates. Preferably, the polyisocyanate composition A comprises oligomeric polyisocyanates and includes not more than 0.3%, 0.2% or 0.1% by weight, based in each case on the weight of the polyisocyanate composition A, of monomeric polyisocyanates.

In a particular embodiment of the invention, a polymer composition A which comprises oligomeric polyisocyanates and is free or essentially free of monomeric polyisocyanates is used. "Essentially free" means here that the content of monomeric polyisocyanates is not more than 0.5% by weight, preferably not more than 0.3%, 0.2% or 0.1% by weight, based in each case on the weight of the polyisocyanate composition A. Surprisingly, this leads to distinctly lower volume shrinkage on crosslinking. The lower exothermicity of this reaction additionally still makes it possible to obtain high-quality polyisocyanurate polymers, in spite of faster and more severe reaction conditions. In addition, polyisocyanates having a low monomer content have a lower risk potential, which very much simplifies the handling and processing thereof.

On the other hand, it is possible through the controlled use of monomeric polyisocyanates to easily adjust the viscosity of the polyisocyanate composition A to the process conditions required. In this case, the monomers added act as reactive diluents and are also incorporated into the polymer matrix on crosslinking.

In another preferred embodiment of the process of the invention, a polyisocyanate composition A rich in monomeric polyisocyanates is used. Such a polyisocyanate composition contains high proportions of monomeric isocyanates. These proportions are preferably at least 20% by weight, more preferably at least 40% by weight, even more preferably at least 60% by weight and most preferably at least 80% by weight.

In a further particular embodiment of the invention, both a low-monomer polyisocyanate composition A and a monomer-rich polyisocyanate composition A may comprise one or more extra monomeric diisocyanates. In this context, "extra monomeric diisocyanate" means that it differs from the monomeric polyisocyanates which make up the greatest proportion of the monomeric polyisocyanates present in the polyisocyanate composition A or the monomeric polyisocyanates which have been used for preparation of the oligomeric polyisocyanates present in the polyisocyanate composition A. Addition of extra monomeric diisocyanate can be advantageous for achieving specific technical effects, for example a particular hardness, a desired elasticity or elongation, or a desired glass transition temperature or viscosity, in the course of processing. Results of particular practical relevance are established when the polyisocyanate composition A has a proportion of extra monomeric diisocyanate in the polyisocyanate composition A of not more than 49% by weight, especially not more than 25% by weight or not more than 10% by weight, based in each case on the weight of the polyisocyanate composition A. Preferably, the polyisocyanate composition A has a content of extra monomeric diisocyanate of not more than 5% by weight, preferably not more than 2.0% by weight, more preferably not more than 1.0% by weight, based in each case on the weight of the polyisocyanate composition A.

In a further particular embodiment of the process according to the invention, the polyisocyanate composition A may contain monomeric monoisocyanates having an isocyanate functionality of 1 or monomeric isocyanates having an isocyanate functionality greater than 2, i.e. having more than two isocyanate groups per molecule. The addition of monomeric monoisocyanates having an isocyanate functionality of 1 or monomeric isocyanates having an isocyanate functionality greater than two has been found to be advantageous in order to influence the network density and/or glass transition temperature of the polyisocyanurate plastic. The mean isocyanate functionality of the polyisocyanate composition A is greater than 1, preferably greater than 1.25, especially greater than 1.5, more preferably greater than 1.75 and most preferably greater than 2. The mean isocyanate functionality of the polyisocyanate composition A can be calculated by dividing the sum total of isocyanate functionalities of all polyisocyanate molecules present in the polyisocyanate composition A by the number of polyisocyanate molecules present in the polyisocyanate composition A. Results of particular practical relevance are established when the polyisocyanate composition A has a proportion of monomeric monoisocyanates having an isocyanate functionality of 1 or monomeric isocyanates having an isocyanate functionality greater than two in the polyisocyanate composition A of not more than 20% by weight, especially not more than 15% by weight or not more than 10% by weight, based in each case on the weight of the polyisocyanate composition A. Preferably, the polyisocyanate composition A has a content of monomeric monoisocyanates having an isocyanate functionality of 1 or monomeric isocyanates having an isocyanate functionality greater than 2 of not more than 5% by weight, preferably not more than 2.0% by weight, more preferably not more than 1.0% by weight, based in each case on the weight of the polyisocyanate composition A. Preferably, no monomeric monoisocyanate having an isocyanate functionality of 1 or monomeric isocyanate having an isocyanate functionality greater than 2 is used in the trimerization reaction according to the invention.

The oligomeric polyisocyanates described here are typically obtained by modifying simple aliphatic, cycloaliphatic, araliphatic and/or aromatic monomeric diisocyanates or mixtures of such monomeric diisocyanates.

The oligomeric polyisocyanates may, in accordance with the invention, especially have uretdione, urethane, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

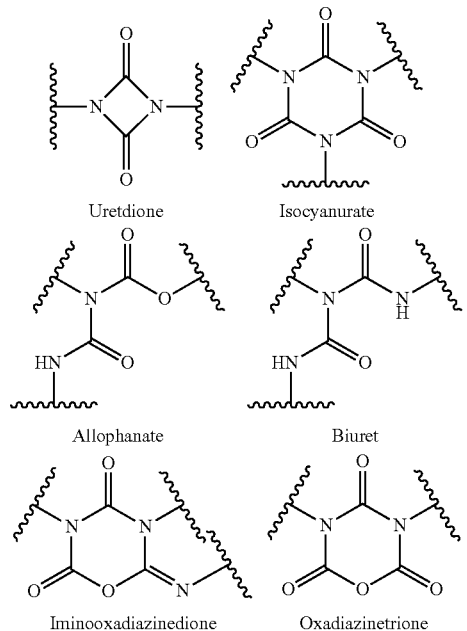

Uretdione    Isocyanurate

Allophanate    Biuret

Iminooxadiazinedione    Oxadiazinetrione

It has been found that, surprisingly, it can be advantageous to use oligomeric polyisocyanates that are a mixture of at least two oligomeric polyisocyanates, the at least two oligomeric polyisocyanates differing in terms of structure. This structure is preferably selected from the group consisting of uretdione, urethane, isocyanurate, allophanate, biuret, iminooxadiazinedione and oxadiazinetrione structure, and mixtures thereof. Particularly, by comparison with trimerization reactions with oligomeric polyisocyanates of just one defined structure, starting mixtures of this kind can lead to an effect on the Tg value, which is advantageous for many applications.

Preference is given to using, in the process according to the invention, a polyisocyanate composition A consisting of at least one oligomeric polyisocyanate having biuret, allophanate, isocyanurate and/or iminooxadiazinedione structure and mixtures thereof. Preference is given to using, in the process according to the invention, a polyisocyanate composition A containing not more than 20 mol %, preferably not more than 10 mol %, more preferably not more than 5 mol %, even more preferably not more than 2 mol % and especially not more than 1 mol % of oligomeric polyisocyanates having urethane structure, for example urethane prepolymers. In a particularly preferred embodiment of the invention, the polyisocyanate composition A, however, while complying with the aforementioned upper limits, is not entirely free of urethane and allophanate groups. For that reason, it preferably contains at least 0.1 mol % of urethane and/or allophanate groups.

In another embodiment, the polyisocyanate composition A containing oligomeric polyisocyanates is one containing only a single defined oligomeric structure, for example exclusively or for the most part isocyanurate structure. In general, as a result of the preparation, however, several different oligomeric structures are present alongside one another in the polyisocyanate composition A.

In the context of the present invention, a polyisocyanate composition A is regarded as a polyisocyanate composition of a single defined oligomeric structure when an oligomeric structure selected from the group consisting of uretdione, urethane, isocyanurate, allophanate, urea, biuret, iminooxadiazinedione and oxadiazinetrione structures is present to an extent of at least 50 mol %, preferably at least 60 mol %, more preferably at least 70 mol %, especially preferably at least 80 mol % and particularly at least 90 mol %, based in each case on the sum total of all oligomeric structures from the group consisting of uretdione, urethane, isocyanurate, allophanate, urea, biuret, iminooxadiazinedione and oxadiazinetrione structure present in the polyisocyanate composition A. In the process according to the invention, in a further embodiment, a polyisocyanate composition A of a single defined oligomeric structure is thus used, the oligomeric structure being selected from the group consisting of uretdione, isocyanurate, allophanate, biuret, iminooxadiazinedione and oxadiazinetrione structures.

In a further embodiment, the oligomeric polyisocyanates are those which have mainly an isocyanurate structure and which may contain the abovementioned uretdione, urethane, allophanate, urea, biuret, iminooxadiazinedione and/or oxadiazinetrione structure only as by-products. Thus, one embodiment of the invention envisages the use of a polymer composition A of a single defined oligomeric structure, the oligomeric structure being an isocyanurate structure and being present to an extent of at least 50 mol %, preferably at least 60 mol %, more preferably at least 70 mol %, especially preferably at least 80 mol % and particularly at least 90 mol %, based in each case on the sum total of the oligomeric structures from the group consisting of uretdione, urethane, isocyanurate, allophanate, urea, biuret, iminooxadiazinedione and oxadiazinetrione structure present in the polyisocyanate composition A.

It is likewise possible in accordance with the invention to use oligomeric polyisocyanates having very substantially no isocyanurate structure, and containing mainly at least one of the abovementioned uretdione, biuret, iminooxadiazinedione and/or oxadiazinetrione structure types. In a particular embodiment of the invention, the polyisocyanate composition A consists to an extent of at least 50 mol %, preferably at least 60 mol %, more preferably at least 70 mol %, especially preferably at least 80 mol % and particularly at least 90 mol %, based in each case on the sum total of the oligomeric structures from the group consisting of uretdione, urethane, isocyanurate, allophanate, urea, biuret, iminooxadiazinedione and oxadiazinetrione structure present in the polyisocyanate composition A, of oligomeric polyisocyanates having a structure type selected from the group consisting of uretdione, allophanate, biuret, iminooxadiazinedione and/or oxadiazinetrione structure.

A further embodiment of the invention envisages the use of a low-isocyanurate polyisocyanate composition A having, based on the sum total of the oligomeric structures from the group consisting of uretdione, urethane, isocyanurate, allophanate, biuret, iminooxadiazinedione and oxadiazinetrione structure present in the polyisocyanate composition A, less than 50 mol %, preferably less than 40 mol %, more preferably less than 30 mol % and especially preferably less than 20 mol %, 10 mol % or 5 mol % of isocyanurate structures.

A further embodiment of the invention envisages the use of a polyisocyanate composition A of a single defined oligomeric structure type, said oligomeric structure type being selected from the group consisting of uretdione, biuret, iminooxadiazinedione and/or oxadiazinetrione structure and this structure type being present to an extent of at least 50 mol %, preferably 60 mol %, more preferably 70 mol %, especially preferably 80 mol % and particularly 90 mol %, based on the sum total of the oligomeric structures from the group consisting of uretdione, urethane, isocyanurate, allophanate, biuret, iminooxadiazinedione and oxadiazinetrione structure present in the polyisocyanate composition A.

The proportions of uretdione, urethane, isocyanurate, allophanate, urea, biuret, iminooxadiazinedione and/or oxadiazinetrione structure in the polyisocyanate composition A can be calculated, for example, from the integrals of proton-decoupled 13C NMR spectra, since the oligomeric structures mentioned give characteristic signals, and each is based on the sum total of uretdione, urethane, isocyanurate, allophanate, urea, biuret, iminooxadiazinedione and/or oxadiazinetrione structures present in the polyisocyanate composition A.

Irrespective of the underlying oligomeric structure type (uretdione, urethane, isocyanurate, allophanate, urea, biuret, iminooxadiazinedione and/or oxadiazinetrione structure), the polyisocyanate composition A for use in the process according to the invention preferably has a (mean) NCO functionality of >1.0 to 6.0, preferably 1.5 to 5.0, more preferably of 2.0 to 4.5.

Results of particular practical relevance are established when the polyisocyanate composition A to be used in accordance with the invention has a content of isocyanate groups of 8.0% to 60.0% by weight. It has been found to be of particular practical relevance when the polyisocyanate composition A according to the invention has a content of isocyanate groups of 14.0% to 30.0% by weight, based in each case on the weight of the polyisocyanate composition A.

Preparation processes for oligomeric polyisocyanates having uretdione, urethane, isocyanurate, allophanate, urea, biuret, iminooxadiazinedione and/or oxadiazinetrione structure are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A is defined in that it contains oligomeric polyisocyanates which have been obtained from monomeric polyisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which are consumed during the process for preparation of the polyisocyanate composition A to form uretdione, urethane, isocyanurate, allophanate, urea, biuret, iminooxadiazinedione and/or oxadiazinetrione structures.

Suitable starting compounds for the oligomeric polyisocyanates are any desired monomeric polyisocyanates obtainable in various ways, for example by phosgenation in the liquid or gas phase or by a phosgene-free route, for example by thermal urethane cleavage. Particularly good results are established when the monomeric polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3- diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates which are likewise suitable are additionally found, for example, in Justus Liebigs Annalen der Chemie Volume 562 (1949) p. 75-136.

In addition, it is also possible in the process according to the invention to use conventional prepolymers bearing aliphatic or aromatic isocyanate end groups, for example polyether, polyester or polycarbonate prepolymers bearing aliphatic or aromatic isocyanate end groups, as mono- and polyisocyanates in the polyisocyanate composition A.

Suitable monomeric monoisocyanates which can optionally be used in the polyisocyanate composition A are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the polyisocyanate composition A is 4-isocyanatomethyloctane 1,8-diisocyanate (triisocyanatononane; TIN).

In one embodiment of the invention, the polyisocyanate composition A contains not more than 80% by weight, especially not more than 50% by weight, not more than 25% by weight, not more than 10% by weight, not more than 5% by weight or not more than 1% by weight, based in each case on the weight of the polyisocyanate composition A, of aromatic polyisocyanates. As used here, "aromatic polyisocyanate" means a polyisocyanate having at least one aromatically bonded isocyanate group. Aromatically bonded isocyanate groups are understood to mean isocyanate groups bonded to an aromatic hydrocarbyl radical.

In a preferred embodiment of the process according to the invention, a polyisocyanate composition A having exclusively aliphatically and/or cycloaliphatically bonded isocyanate groups is used. Aliphatically and cycloaliphatically bonded isocyanate groups are respectively understood to mean isocyanate groups bonded to an aliphatic and cycloaliphatic hydrocarbyl radical.

In another preferred embodiment of the process according to the invention, a polyisocyanate composition A consisting of or comprising one or more oligomeric polyisocyanates is used, where the one or more oligomeric polyisocyanates has/have exclusively aliphatically and/or cycloaliphatically bonded isocyanate groups.

In a further embodiment of the invention, the polyisocyanate composition A consists to an extent of at least 55%, 70%, 80%, 85%, 90%, 95%, 98% or 99% by weight, based in each case on the weight of the polyisocyanate composition A, of oligomeric polyisocyanates having exclusively aliphatically and/or cycloaliphatically bonded isocyanate groups. Practical experiments have shown that particularly good results can be achieved with polyisocyanate compositions A in which the oligomeric polyisocyanates present therein have exclusively aliphatically and/or cycloaliphatically bonded isocyanate groups.

In a particularly preferred embodiment of the process according to the invention, a polyisocyanate composition A is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

Crosslinking Catalyst B

The novel anisotropic composite materials according to the invention are obtainable by crosslinking of polyisocyanates, especially by trimerization of the isocyanate groups. The crosslinking catalyst B has the task of triggering the crosslinking reaction of the reactive resin mixture in a controlled manner at a desired juncture in process step d).

The crosslinking catalyst B may be mixed from one catalyst type or different catalyst types, but contains at least one catalyst that brings about the trimerization of isocyanate groups to isocyanurates or iminooxadiazinediones.

Since the process according to the invention finds use in particular in the context of production of composite materials by pultrusion, suitable crosslinking catalysts B are characterized by a combination of sufficiently long pot life at room temperature and rapid curing of the polyisocyanate composition A at elevated temperatures as defined below.

Rapid curing is especially required for pultrusion in that the residence time of the workpiece in the shaping tool is adequate for curing of the matrix, without designing the shaping tool with excessive length (high apparatus outlay) or setting too low a pulling speed (low productivity).

The pulling speed in the process according to the invention is preferably at least 0.2 metre/minute (m/min), more preferably at least 0.5 m/min, even more preferably at least 0.8 m/min and most preferably at least 1.0 m/min.

The heated mould in which the curing takes place preferably has a length of not more than 2.0 m, more preferably not more than 1.5 m and most preferably not more than 1.0 m.

Thus, suitable trimerization catalysts for the process according to the invention are in principle all compounds which bring about curing of the polyisocyanate composition A within less than 20 minutes, preferably less than 10 minutes, more preferably within less than 5 minutes, especially within less than 2 minutes and most preferably within less than 1 minute at 180° C. The term "curing" of the polyisocyanate composition A here represents a state in which there are only at most 20%, more preferably at most 10% and most preferably at most 5% of the isocyanate groups originally present in the polyisocyanate composition A. Most preferably, after 10 minutes at 180° C., there are only at most 20% of the isocyanate groups originally present.

The pot life of a polyisocyanate composition A after addition of the crosslinking catalyst B, as defined further down in this application, is at least 5 minutes, especially at least 10 minutes, preferably at least 20 minutes, more preferably at least one hour, even more preferably at least 3 hours and most preferably at least 24 hours. The pot lives are preferably determined at a temperature of 28° C. and more preferably 23° C.

Particularly preferred catalysts bring about curing within less than 20 minutes at 180° C. with a pot life of at least 5 minutes. The pot life in this embodiment is preferably determined at 23° C.

Very particularly preferred catalysts bring about curing within less than 5 minutes at 180° C. and with a pot life of at least 3 hours. The pot life in this embodiment is preferably determined at 23° C.

Suitable isocyanate trimerization catalysts are in principle all compounds having the above-defined combinations of curing speed and pot life which accelerate the addition of isocyanate groups to give isocyanurate groups and as a result crosslink the molecules containing isocyanate groups that are present.

The trimerization catalyst is preferably an alkaline salt. Said salt is preferably selected from the group consisting of alkoxides, amides, phenoxides, carboxylates, carbonates, hydrogencarbonates, hydroxides, cyanides, isocyanides, thiocyanides, sulphinates, sulphites, phosphinates, phosphonates, phosphates or fluorides. The counterion is preferably selected from the group consisting of metal ions, ammonium compounds, phosphonium compounds and sulphur compounds.

Likewise suitable are simple tertiary amines, for example triethylamine, tributylamine, N,N-dimethylaniline, N-ethylpiperidine or N,N'-dimethylpiperazine, and the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems known from GB 2 222 161 that consist of mixtures of tertiary bicyclic amines, for example DBU, with simple aliphatic alcohols of low molecular weight.

Particular preference is given to carboxylates and phenoxides with metal or ammonium ions as counterion. Suitable carboxylates are the anions of all aliphatic or cycloaliphatic carboxylic acids, preferably those with mono- or polycarboxylic acids having 1 to 20 carbon atoms. Suitable metal ions are derived from alkali metals or alkaline earth metals, manganese, iron, cobalt, nickel, copper, zinc, zirconium, cerium, tin, titanium, hafnium or lead. Preferred alkali metals are lithium, sodium and potassium, more preferably sodium and potassium. Preferred alkaline earth metals are magnesium, calcium, strontium and barium.

Very particular preference is given to the octoate and naphthenate catalysts described in DE-A 3 240 613, these being octoates and naphthenates of manganese, iron, cobalt, nickel, copper, zinc, zirconium, cerium or lead, or mixtures thereof with acetates of lithium, sodium, potassium, calcium or barium.

Very particular preference is likewise given to sodium benzoate or potassium benzoate, to the alkali metal phenoxides known from GB Patent 1 391 066 and GB Patent 1 386 399, for example sodium phenoxide or potassium phenoxide, and to the alkali metal and alkaline earth metal oxides, hydroxides, carbonates, alkoxides and phenoxides that are known from GB 809 809.

Trimerization catalysts B which fulfil the abovementioned requirements on pot life and reaction rate to a particular degree are basic metal compounds and basic quaternary ammonium salts, especially basic alkali metal or alkaline earth metal compounds.

In this application, a "quaternary ammonium" is understood to mean a compound of the formula $NR_4^+$ where the "R" radical comprises organic radicals, especially alkyl or aryl radicals. Preferably, the quaternary ammonium is a compound of the formula $NR_4^+$ where each of the R radicals is independently a linear or branched alkyl radical having 1 to 18 carbon atoms.

In the context of the study underlying the present invention, it was surprisingly possible to identify a catalyst system particularly suitable for the process according to the invention. This catalyst system preferably contains at least one alkali metal or alkaline earth metal compound. Particular preference is given to alkali metal compounds. Especially preferred is a compound with potassium. The alkali metal or alkaline earth metal is preferably in ionic form. It is very particularly preferred that the aforementioned alkali metal or alkaline earth metal compounds are basic compounds.

In a particularly preferred embodiment of the present invention, the alkali metal or alkaline earth metal is present in a basic salt. The latter is preferably selected from the group consisting of alkoxides, amides, phenoxides, carbonates, hydrogencarbonates, hydroxides, cyanides, isocyanides, thiocyanides, sulphides, sulphites, sulphinates, phosphites, phosphinates, phosphonates, phosphates and fluorides. Very particular preference is given to salts of carboxylic acids. Preference is given here to aliphatic carboxylic acids having 1 to 20 and especially having 1 to 10 carbon atoms. Particular preference is given to salts of formic acid, acetic acid, propionic acid, butyric acid, valeric acid, caproic acid, 2-ethylhexanoic acid, enanthic acid, caprylic acid, pelargonic acid or capric acid. Very particular preference is given to salts of acetic acid. In the most preferred embodiment, the catalyst is potassium acetate.

In a preferred embodiment of the invention, the catalysts disclosed as inventive in U.S. Pat. No. 4,540,781, especially compounds of the formulae (Ia), (IIa) and (IIIa), are excluded from the scope of protection of the present application.

The trimerization catalyst B preferably contains a polyether. This is especially preferred when the catalyst contains metal ions. Preferred polyethers are selected from the group consisting of crown ethers, diethylene glycol, polyethylene glycols and polypropylene glycols. It has been found to be of particular practical relevance in the process according to the invention to use a trimerization catalyst B containing, as polyether, a polyethylene glycol or a crown ether, more preferably 18-crown-6 or 15-crown-5. Preferably, the trimerization catalyst B comprises a polyethylene glycol having a number-average molecular weight of 100 to 1000 g/mol, preferably 300 g/mol to 500 g/mol and especially 350 g/mol to 450 g/mol. Very particular preference is given to the combination of basic salts of alkali metals or alkaline earth metals as defined above with a polyether.

In another embodiment of the invention the polyether comprises at least partly ethylene oxide ($—CH_2—CH_2—O—$) building blocks. Preferably, the polyether comprised by trimerization catalyst B comprises segments with at least 2 or more continuously connected ethylene-oxide units, more preferably with 4 or more continuously connected ethylene oxide units, even more preferably with 5 or more continuously connected ethylene oxide units and most preferably with 7 or more continuously connected ethylene oxide units in the polymer chain. The term "continuously connected" refers to the direct linkage between two ethylene oxide building blocks. It was found that such polyethers having continuously connected ethylene oxide units in the polyether chain gave better co-catalytic effects especially in combination with basic salts of alkali metals or alkaline earth metals compared to other polyethers having no or only separated single ethylene oxide units in the polymer chain.

The number-average molecular weight is always determined in the context of this application by gel permeation chromatography (GPC) in tetrahydrofuran at 23° C. The procedure is according to DIN 55672-1: "Gel permeation chromatography, Part 1-Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass are used for calibration. The number-average molecular weight is calculated with software support. Baseline points and evaluation limits are fixed according to DIN 55672 Part 1.

The polyethers may also bear further functionalities, for example at the polyether chain ends or in the polyether chain, in order to assure better solubility in the polyisocyanate composition A or better co-catalytic action. Derivatized polyethers of this kind are also covered here by the term "polyether".

Very particularly preferred trimerization catalysts B for the process according to the invention comprise potassium acetate or potassium octoate as alkali metal salt and polyethylene glycols as polyether, especially potassium acetate and polyethylene glycol having a number-average molecular weight Mn of 350 to 400 g/mol. The polyethylene glycol preferably has a polydispersity of less than 5.

The catalyst concentration, as well as the temperature, is an important setting parameter for the process for producing the anisotropic composite materials according to the invention. If the concentration of the catalyst in the reactive resin mixture is too low, the crosslinking reaction overall is too slow and the process is inefficient. If the catalyst concentration in the reactive resin mixture is too high, this causes too great a reduction in the pot life of the resin mixture, defined as the time span from the mixing of the polyisocyanate composition A with the crosslinking catalyst B until the juncture at which the viscosity of the reaction mixture at 23° C. is three times the starting value, and the process can no longer be performed in a practicable manner. The starting value of the viscosity of the reactive resin mixture is measured right after the mixing of all components is finished.

In the process according to the invention, the crosslinking catalyst B is generally used in a concentration based on the amount of the polyisocyanate composition A used of 0.04% to 15.0% by weight, preferably of 0.10% to 8.0% by weight and more preferably of 0.5% to 5.0% by weight. In this case, for calculation of the concentration, the trimerization catalyst B considered is merely the mixture of the at least one basic compound of the alkali metals or alkaline earth metals and the at least one polyether.

The trimerization catalysts B that are used in the process according to the invention generally have sufficient solubility or dispersibility in the polyisocyanate composition A in the amounts that are required for initiation of the crosslinking reaction. The trimerization catalyst B is therefore preferably added to the polyisocyanate composition A in neat form.

"Addition of the trimerization catalyst B in neat form" means that the metal salt and/or quaternary ammonium salt is dissolved or at least suspended in the polyether. The proportion of the metal salt and/or quaternary ammonium salt in this solution is less than 50% by weight, preferably less than 25% by weight, more preferably less than 20% by weight or less than 15% by weight, and especially less than 10% by weight. However, the proportion is in any case greater than 0.01% by weight. The aforementioned proportions are based on the total weight of quaternary ammonium salt or metal salt and polyether.

In another embodiment of the invention the metal salt and/or quaternary ammonium salt is dissolved or at least suspended in the polyether. The proportion of the cation of the metal salt and/or quaternary ammonium salt in this solution is less than 25% by weight, preferably less than 15% by weight, more preferably less than 10% by weight or less than 8% by weight, and especially less than 5% by weight. However, the proportion is in any case greater than 0.001% by weight. The aforementioned proportions are based on the total weight of quaternary ammonium salt or metal salt and polyether.

Optionally, however, the trimerization catalysts B can also be used dissolved in a suitable organic solvent to improve their incorporation. The dilution level of the catalyst solutions can be chosen freely within a very wide range.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

If catalyst solvents are used in the process according to the invention, preference is given to using catalyst solvents which bear groups reactive toward isocyanates and can be incorporated into the polyurethane plastic. Examples of such solvents are mono- and polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents. The use of such catalyst solvents or the addition of at least one compound selected from the group consisting of alcohols, urethanes, amines, ureas, thiols, thiourethanes, allophanates and biuret is also advantageous because it has been found that the catalytic reaction for conversion of isocyanate to isocyanurate groups or iminooxadiazinedione groups is accelerated by the presence of hydrogen donors as cocatalysts. The concentration of hydrogen donors, for example urethane groups, in the mixture of polyisocyanate composition A and crosslinking catalyst B is preferably in the range from 0.1 mol % to 20 mol %, more preferably 0.1 mol %-5 mol %.

Fibrous Filler C

The fibres are of great significance for the production of the novel anisotropic composite materials according to the invention. It is known to the person skilled in the art that the properties of anisotropic, fibre-reinforced composite materials depend very greatly on the nature of the fibres, the fibre content, the fibre orientation and the type and binding to the matrix. Through a suitable choice of these parameters, the person skilled in the art is able to establish desired properties.

In the process according to the invention the curing of the polyisocyanate composition A takes place in the presence of a fibrous filler C.

Suitable fibrous fillers C are, for example, all inorganic fibres, organic fibres, natural fibres or mixtures thereof that are known to those skilled in the art.

According to the invention, suitable fibrous fillers C are all fibres having an aspect ratio greater than 1000, preferably greater than 5000, more preferably greater than 10 000 and most preferably greater than 50 000. The aspect ratio is defined as the length of the fibres divided by the diameter.

While complying with the above-defined aspect ratio, the fibrous fillers preferably have a minimum length of 1 m, more preferably 50 m and most preferably 100 m.

Preferred inorganic fibres are glass fibres, basalt fibres, boron fibres, ceramic fibres, whiskers, silica fibres and metallic reinforcing fibres. Preferred organic fibres are aramid fibres, polyethylene fibres, carbon fibres, carbon nanotubes, polyester fibres, nylon fibres and Plexiglas fibres. Preferred natural fibres are flax fibres, hemp fibres, wood fibres, cellulose fibres and sisal fibres.

In a preferred embodiment of the invention, the fibrous filler C is selected from the group consisting of glass fibres, basalt fibres, carbon fibres and mixtures thereof. The fibres may be in individual form, but they can also be woven or knitted in any form known to those skilled in the art to give mats or fleeces. Preferably less than 50% by weight, more preferably less than 35% by weight, even more preferably less than 20% by weight and most preferably less than 10% by weight of the fibres used are in the form of mats or fleeces.

The individual fibres preferably have a diameter of less than 0.1 mm, more preferably less than 0.05 mm, and even more preferably less than 0.03 mm.

In a preferred embodiment of the invention, there is a sizing on the surface of the fibres. The sizing is a thin polymer film which frequently contains reactive groups and which improves wetting with the resin or the binding between the matrix and the fibre.

In a further embodiment of the invention, the fibres used exhibit a low water content. Water can be absorbed, for example, on the surface of the fibres and enter into unwanted side reactions with isocyanate groups later on. It has therefore been found to be advantageous when the water content of the fibres is less than 5% by weight, preferably less than 3% by weight, more preferably less than 2% by weight, especially less than 1% by weight and most preferably less than 0.5% by weight, based on the total weight of fibres. At best, the fibres have zero moisture content. This can be achieved if appropriate by a step of drying the fibres that takes place prior to the wetting step c). The moisture content of the fibres can be determined by gravimetric measurement before and after drying, preferably at 120° C. for 2 hours.

In a preferred embodiment of the present invention, at least 50%, more preferably at least 70%, even more preferably at least 80% and most preferably at least 90% of the fibres are oriented parallel to one another. Fibres are oriented parallel to one another when the angle between them is less than 15 degrees, preferably less than 10 degrees and even more preferably less than 5 degrees over a length of 0.5 m, preferably 1 m and more preferably 2 m. Most preferably, the angle between at least 90% of the fibres over a length of 2 m is not more than 10 degrees and even more preferably not more than 5 degrees. The person skilled in the art will be aware that the details above are only meaningful in the case of use of individual fibres. If the fibres used are in the form of mats or fleeces, it is clear from the arrangement of the fibres in these materials that these conditions cannot be complied with.

The ratio between the polyisocyanate composition A, the fibrous filler C and all other constituents of the composite material is preferably chosen such that the fibre content makes up at least 30% by volume, preferably 45% by volume, even more preferably at least 50% by volume, even more preferably still at least 60% by volume and most preferably at least 65% by volume of the cured composite material.

Wetting

For production of the anisotropic composite materials according to the invention, the fibrous filler C is wetted in process step c) with the reactive resin mixture from process step a). Good wetting is necessary to assure transmission of force between the fibres in the finished component at a later stage and to avoid inclusions, for example air.

In one embodiment of the invention, all known processes that enable good wetting of the fibres with the resin matrix are suitable. Without any claim to completeness, these include a dipping bath, an injection box, spraying methods, resin injection methods, resin infusion methods with vacuum or under pressure, an application roll and manual lamination methods.

In a particular embodiment of the invention, preference is given to using the dipping bath. The dried fibres are pulled here through an open resin bath, with deflection of the fibres into and out of the resin bath via guide grids (bath method). Alternatively, the fibres also can be pulled straight through the impregnation device without deflection (pull-through method).

In a further embodiment of the invention, particular preference is given to using the injection box. In the case of the injection box, the fibres are pulled without deflection into the impregnation unit that already has the shape of the later profile. By means of pressure, the reactive resin mixture is pumped into the box, preferably transverse to the fibre direction. In general, the impregnation unit is directly attached to the pultrusion mould.

The fibre impregnation step can be conducted either continuously or batchwise; preference is given to a continuous process. A "continuous" process in the context of the invention is one in which the transport of fibres does not stop during the impregnation.

It has been found to be advantageous when the fibres that are in the form of fibre bundles, called rovings, are spread prior to the impregnation step in order to achieve better impregnation of the individual fibres. This can be achieved, by way of example, by deflection on deflecting rolls or guide grids.

The viscosity of the reactive resin mixtures likewise has a crucial effect on the wetting of the fibres. For example, an excessively high viscosity makes it difficult for the resin to penetrate into the spaces between the fibres. It has therefore been found to be advantageous that the viscosity of the reactive resin under the conditions for the impregnation of the fibres in process step c) is <30 000 mPas, preferably <15 000 mPas, more preferably <10 000 mPas, <5000 mPas, <3000 mPas, <2000 mPas and especially <1500 mPas. At best, the viscosity is between 10 mPas and 1000 mPas.

The viscosity of the reactive resin mixture in wetting step c) can be adjusted via various methods.

Examples of these include the use of solvents as in the case of the catalysts, or the addition of reactive diluents, for example monomeric polyisocyanates. It is also possible to adjust the viscosity of the reactive resin mixture by means of temperature control, although the altered pot life has to be noted.

Hardening

The "curing" of the polyisocyanate composition A in process step d) is a process in which the isocyanate groups present therein react with one another or with urethane groups already present to form uretdione, isocyanurate, allophanate, biuret, iminooxadiazinedione and oxadiazinetrione structures. In this reaction, the isocyanate groups originally present in the polyisocyanate composition A are consumed. The formation of the aforementioned groups results in crosslinking of the monomeric and oligomeric polyisocyanates present in the polyisocyanate composition A.

The "curing" can be either continuous or batchwise, but is preferably continuous. "Continuous" in the context of the invention means that the transport of fibres does not stop during the "hardening", for example in the pultrusion. However, short stoppages of less than 5 seconds, preferably less than 2 seconds, can occur in the course of continuous hardening, provided that they are rare in relation to the overall duration of the process. "Rare" stoppages are the aforementioned stoppages when they occur not more than twice within 5 minutes. In the case of batchwise curing, the transport of fibres, by contrast, stops at least once for at least 5 seconds, preferably at least 10 seconds, within 5 minutes.

Before the hardening, the fibrous filler C wetted with the polyisocyanate composition A is preferably arranged such that at least 50%, more preferably at least 70%, even more preferably at least 80% and most preferably at least 90% of the fibres are oriented parallel to one another as defined further up in this application.

Since isocyanurate formation, depending on the catalyst used, is frequently accompanied by side reactions, for example dimerization to give uretdione structures or trimerization to form iminooxadiazinediones (called asymmetric trimers), and by allophanatization reactions in the case of presence of urethane groups in the starting polyisocyanate, the terms "trimerization" and "crosslinking" also synonymously represent these side reactions that proceed additionally in the context of the present invention.

The effect of the curing of the polyisocyanate composition A is that the nitrogen components bound within uretdione, isocyanurate, biuret and iminooxadiazinedione structures preferably add up to at least 60%, more preferably to at least 65%, especially preferably to at least 70%, 75%, 80%, 85%, 90% and most preferably to at least 95% of the total nitrogen content of the polyisocyanate composition A. It should be taken into account here that, in accordance with the invention, only one of the aforementioned structures has to be present and, depending on the nature of the crosslinking catalyst chosen, one or more of the aforementioned structures may also be completely absent.

In one embodiment of the invention, therefore, at least 60%, more preferably at least 65%, especially preferably at least 70%, 75%, 80%, 85%, 90% and most preferably at least 95% of the total nitrogen content of the polyisocyanate composition A after curing is bound within uretdione, isocyanurate, biuret and iminooxadiazinedione structures.

Preferably, the effect of the crosslinking reaction is that at most 20%, preferably at most 10%, more preferably at most 5%, even more preferably at most 2% and especially at most 1% of the total nitrogen content of the polyisocyanate composition A is present in urethane and/or allophanate groups.

In a particularly preferred embodiment of the invention, the cured polyisocyanate composition A, however, is not entirely free of urethane and allophanate groups. For that reason, it preferably contains at least 0.1% of urethane and/or allophanate groups based on the total nitrogen content.

In another embodiment, trimerization means that at least 50%, preferably at least 60%, more preferably at least 70%, especially at least 80% and most preferably 90% of the isocyanate groups present in the polyisocyanate composition A form at least one structure selected from the group consisting of uretdione, isocyanurate, biuret, iminooxadiazinedione and oxadiazinetrione structures In a particular embodiment, however, trimerization means that predominantly cyclotrimerizations of at least 50%, preferably at least 60%, more preferably at least 70%, especially at least 80% and most preferably 90% of the isocyanate groups present in the polyisocyanate composition A to give isocyanurate structural units are catalysed. Thus, in the finished material, corresponding proportions of the nitrogen originally present in the polyisocyanate composition A are bound within isocyanurate structures. However, side reactions, especially those to give uretdione, allophanate and/or iminooxadiazinedione structures, typically occur and can even be used in a controlled manner in order to advantageously affect, for example, the glass transition temperature (Tg) of the polyisocyanurate plastic obtained. However, the above-defined content of urethane and/or allophanate groups of 0.1% to 20%, preferably 0.1% to 10%, more preferably 0.1% to 5% and most preferably 0.1 to 1% of the total nitrogen content of the polyisocyanate composition A are present in this embodiment too.

In order to achieve the above-described proportions of uretdione, isocyanurate, biuret and iminooxadiazinedione structures in the cured resin, the ratio of free isocyanate groups to all other components having groups which are capable of reacting with isocyanate groups is chosen so that the molar ratio of free isocyanate groups to the sum of hydroxyl, amino and thiol groups in the reactive resin mixture is at least 2.0:1.0, preferably 2.5:1.0, more preferably 5.0:1.0 and most preferably 10.0:1.0. This definition applies to all embodiments described in the section which relates to the curing of the polyisocyanate composition A.

In the course of hardening of the polyisocyanate composition A a shaped body is formed, preferably a profile. A "profile" as understood in the present application is a body having the same cross section essentially over its entire length. The "profile" has a length of preferably at least 2 m, more preferably at least 10 m and even more preferably at least 50 m. It is explicitly the case that the profile can be divided into multiple segments after the curing of the polyisocyanate composition in process step d). The above-specified lengths then relate to a hypothetically undivided product as originates from the hardening step d) and would be present without further division.

In various processes for production of profiles, for example pultrusion as described below, it may be the case for technical reasons that the cross section of the profile on commencement of manufacturing is not yet entirely stable. It is likewise conceivable that faults occur during or at the end of the production process. For this reason, a profile has "the same cross section essentially over its entire length" even when this cross section is not always attained at all times for manufacturing reasons. It is assumed here that these sections are short in relation to the total length of the profile. Said sections with a different cross section are short when the total length thereof is less than 10%, preferably less than 5% and most preferably less than 1% of the total length of the hypothetical undivided profile. A different cross section is understood to mean a value that differs by at least 10% from the average value or the desired value.

Composite materials in profile form with a fibrous filler material having fibres oriented essentially parallel to one another can be produced by pultrusion methods.

Pultrusion is a continuous production process for manufacture of fibre-reinforced plastics profiles. The basic construction of a pultrusion system consists of the fibre rack, devices for fibre guiding, an impregnation device, a hardening mould, reciprocal pulling devices and a cutting unit.

The reels of rovings are stored in the fibre rack. From the fibre rack, the fibre rovings are guided by means of fibre guides to the impregnation device, where the wetting step with the reactive resin is effected. The fibres are already generally aligned or pre-sorted into the profile form desired at a later stage by means of the fibre guides or else the impregnation device. In addition, if required, mats, weaves, scrims or nonwovens can be integrated into the process in order to optimize the mechanical properties for the desired use.

Subsequently, the resin-impregnated fibres run through the shaping hardening mould, where the crosslinking of the reactive groups of the resin to give the polymer (matrix) is usually effected via elevated temperature. This is frequently followed by a cooling zone, for example air cooling, before the now complete semifinished product is pulled through the alternating pulling devices (pullers). These ensure continuous transport of the material throughout the pultrusion process. In the last process step, the material is cut to the desired length. This is frequently done using a 'flying saw', meaning that the saw runs at the same speed as the material and in so doing cuts it. In this way, a straight cut edge is obtained, and the profile is prevented from backing up and the process is prevented from being stopped during the sawing step.

Irrespective of the exact configuration of the process described above, the curing step d) is characterized in that "curing" of the polyisocyanate composition A is achieved as defined further up in this application in connection with the catalyst within the periods of time specified there. The curing is preferably effected at temperatures between 80° C. and 350° C., more preferably between 100° C. and 300° C. and most preferably between 150° C. and 250° C.

To assure a pultrusion process of maximum efficiency, the curing in the curing step d), in a particular embodiment of the invention, is effected at curing temperatures exceeding 150° C., preferably exceeding 180° C., more preferably exceeding 200° C., even more preferably exceeding 210° C., exceeding 220° C., and most preferably exceeding 230° C.

Additives/Demoulding Agents

The composite polyisocyanurate materials obtainable by the process according to the invention, even as such, i.e. without addition of appropriate auxiliaries and additives D, feature very good light stability and/or weathering resistance. Nevertheless, it is optionally possible to use standard auxiliaries and additives D as well in the production thereof, for example standard fillers, UV stabilizers, antioxidants, mould release agents, water scavengers, slip additives, defoamers, levelling agents, rheology additives, flame retardants and/or pigments (organic and inorganic). These auxiliaries and additives D, excluding fillers D, and flame retardants, are typically present in the composite polyisocyanurate material in an amount of less than 10% by weight, preferably less than 5% by weight, more preferably up to 3% by weight, based on the polyisocyanate composition A. Flame retardants are typically present in the composite polyisocyanurate material in amounts of not more than 70% by weight, preferably not more than 50% by weight and more preferably not more than 30% by weight, calculated as the total amount of flame retardants used, based on the total weight of the polyisocyanate composition A.

The additives D are added to the polyisocyanate composition A or to the reactive resin mixture from process step a) prior to the wetting of the fibres in process step c). Preferably, the addition is effected directly prior to process step a), between process steps a) and b), or after process step b).

Suitable fillers $D_w$) are, for example, $Al(OH)_3$, $CaCO_3$, silicon dioxide, magnesium carbonate, $TiO_2$, ZnS, minerals comprising silicates, sulphates, carbonates and the like, such as magnesite, baryte, mica, dolomite, kaolin, clay minerals, metal pigments, for example based on brass or aluminium, and also carbon black, graphite, boron nitride and other known customary fillers. These fillers $D_w$) are preferably used in amounts of not more than 50% by weight, preferably not more than 30% by weight, more preferably not more than 20% by weight, even more preferably not more than 15% by weight, especially not more than 10%, 5%, 3% by weight, calculated as the total amount of fillers used, based on the total weight of the polyisocyanate composition A.

Suitable UV stabilizers $D_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1,4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenyl propionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers may be employed either individually or in any desired combinations with one another.

Particularly preferred UV stabilizers $D_x$) for the composite polyisocyanurate materials producible in accordance with the invention are those which absorb radiation of wavelength <400 nm. These include, for example, the benzotriazole derivatives mentioned. Very particularly preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

It is optionally possible to add one or more of the UV stabilizers $D_x$) mentioned by way of example to the polyisocyanate composition A, preferably in amounts of 0.001% to 3.0% by weight, more preferably 0.01% to 2% by weight, calculated as the total amount of UV stabilizers used, based on the total weight of the polyisocyanate composition A.

Suitable antioxidants $D_y$) are preferably sterically hindered phenols, which may be selected preferably from the group consisting of vitamin E, 2,6-di-tert-butyl-4-methylphenol (ionol) and derivatives thereof, pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. Other classes of antioxidants are hindered aminic stabilizers, and what are called HAS bases and HALS bases. Typical representatives are bis(1-octyloxy-2,2,6,6-tetramethyl-4-piperidinyl) sebacate, N-phenylbenzeneamine, reaction products with 2,4,4-trimethylpentene, n-butyl 3,5-di-tert-butyl-4-hydroxybenzyl bis(1,2,2,6-pentamethyl-4-piperidinyl)malonate, bis(1,2,2,6,6-pentamethyl-4-piperidinyl)sebacate and bis(2,2,6,6-tetramethyl-4-piperidinyl)sebacate. Further classes are triesters of phosphorous acid (phosphites) and thioethers. If required, all antioxidants can be used either individually or in any desired combinations with one another.

These antioxidants $D_y$ are preferably used in amounts of 0.001% to 5.0% by weight, more preferably 0.1% to 2.0% by weight, calculated as the total amount of antioxidants used, based on the total weight of the polyisocyanate composition A.

The process according to the invention can, apart from the small amounts of any catalyst solvents to be used in addition, be conducted in a solvent-free manner.

Further auxiliaries and additives D added, finally, may also be internal mould release agents $D_z$.

These are preferably the nonionic surfactants containing perfluoroalkyl or polysiloxane units that are known as mould release agents, quaternary alkylammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic monoalkyl and dialkyl phosphates and trialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis (tridecanol) phosphate, stearyl phosphate, distearyl phosphate, waxes such as beeswax, montan wax or polyethylene oligomers, metal salts and esters of oily and fatty acids such as barium stearate, calcium stearate, zinc stearate, glycerol stearate and glycerol laurate, esters of aliphatic branched and unbranched alcohols having 4 to 36 carbon atoms in the alkyl radical, and any desired mixtures of such mould release agents.

Particularly preferred mould release agents $D_z$ are the fatty acid esters and salts thereof mentioned, and also acidic mono- and dialkyl phosphates mentioned, most preferably those having 8 to 36 carbon atoms in the alkyl radical.

Internal mould release agents $D_z$ are used in the process according to the invention, if appropriate, in amounts of 0.01% to 15.0% by weight, preferably 0.02% to 10.0% by weight, more preferably 0.05% to 7.0% by weight, especially 0.1% to 5% by weight and most preferably from 0.3% to 3% by weight, calculated as the total amount of internal mould release agent used, based on the total weight of the polyisocyanate composition A.

In the study underlying the present invention, it has been found that, surprisingly, the addition of fatty acid salts, especially stearate salts, to the polyisocyanate composition A allows the tensile forces in pultrusion to be considerably lowered under otherwise identical conditions. At the same time, there is a distinct rise in surface quality of the pultrudates, the surface becomes smoother and abrasion at the heating mould outlet is distinctly reduced. Moreover, because of the lower friction, the pultrusion rate (for a given tensile force) can be increased, which makes the process more efficient.

Consequently, in a particularly preferred embodiment of the invention, stearate salts, especially zinc stearate and/or calcium stearate, are used as demoulding agent. Very particular preference is given to zinc stearate. These mould release agents are used in amounts of less than 10% by weight, preferably less than 5% by weight, more preferably less than 2% by weight and most preferably less than 1% by weight, based on the total weight of the polyisocyanate composition A. It is preferable here that the polyisocyanate composition A contains at least 0.001% by weight of stearate salts, preferably >0.01% by weight, even more preferably >0.1% by weight and most preferably >0.25% by weight, based on the total weight thereof.

In a particularly preferred embodiment of the invention, stearate salts, particularly zinc stearate and/or calcium stearate and especially zinc stearate, are used in combination with one or more further internal mould release agents in the pultrusion. The further mould release agents may be phosphoric esters, fatty acids, fatty acid esters or amides, siloxane derivatives, long-chain alcohols, for example isotridecanol, waxes and montan waxes, and any desired mixtures thereof. The mixing ratio between the stearate salt and the further mould release agents can be optimized arbitrarily by the person skilled in the art according to the profile form and the pultrusion conditions, but is preferably less than 90% by weight, preferably less than 50% by weight, especially less than 30% by weight and most preferably between 2% and 25% by weight of stearate salt, based on the amount of all internal mould release agents used. The total content of all internal mould release agents is as set out above.

Composite Material

A composite material is obtainable with the aid of the process described above. Thus, the present invention relates, in a further embodiment, to a composite material which is anisotropic in respect of at least one property and is obtainable by a pultrusion process, comprising the steps of
  a) providing a reactive resin mixture comprising at least one reactive polyisocyanate composition A and at least one crosslinking catalyst B, b) providing a fibrous filler C, the fibres of which have an aspect ratio of at least 1000,
c) wetting the fibrous filler C with the reactive resin mixture from process step a),
d) curing the resin-impregnated fibrous filler by means of one or more chemical reactions, wherein at least 50% of the free isocyanate groups in the polyisocyanate composition A are crosslinked to give at least one structure selected from the group consisting of uretdione, isocyanurate, biuret, iminooxadiazinedione and oxadiazinetrione structures.

All definitions that have been given further up in this application in relation to the process are also applicable in respect of this embodiment of the invention.

In a further embodiment, the present invention relates to a composite material which is anisotropic in respect of at least one property and comprises fibres C having an aspect ratio of at least 1000, the flexural modulus of which in axial direction is at least 30 GPa, wherein the composite material has a nitrogen content of at least 9% by weight, based on the resin content, and at least 60% of the nitrogen is bound in isocyanurate groups.

The resin in the composite material preferably comprises a cured polyisocyanate composition A as defined further up in this application. More preferably, the resin consists to an extent of at least 80% by weight, especially to an extent of at least 90% by weight, of the cured polyisocyanate composition A.

The material according to the invention is preferably obtainable by the pultrusion process described further up in this application. It is preferable here that the reactive resin mixture is cured within less than 20 minutes, preferably less than 10 minutes and most preferably within less than 5 minutes at 180° C.

In a particularly preferred embodiment of the invention, for the hardening of the polyisocyanate composition A, a basic metal salt, especially a basic alkali metal or alkaline earth metal salt, is used as catalyst. This execution is preferred especially when the composite material of the invention is obtained by pultrusion.

Properties of the Composite Material

For structural components, especially in the construction sector or in the transport industry, as well as the mechanical properties, further features such as flame retardancy or lack of combustibility and weathering resistance also play a crucial role in the selection of the material. Without being bound to a particular theory, for example, materials having a high nitrogen content and low-energy bonds, for example isocyanurate bonds, are advantageous in the shaping of such features. It is therefore likewise desirable in the context of the invention to provide a composite material having a maximum nitrogen content or having a high content of low-energy isocyanurate bonds.

In one embodiment of the composite material according to the invention, the nitrogen content of the polymer matrix, meaning the total nitrogen bound or present within the matrix divided by the total amount of polymer (each based on weight), is at least 9% by weight, preferably at least 10% by weight, more preferably at least 11% by weight, greater than 12% by weight, greater than 13% and greater than 14% by weight or greater than 15% by weight and most preferably greater than 16% by weight of nitrogen.

The nitrogen content of the polymer matrix can be determined with the aid of a vario EL Cube from elementar Americas INC. This involves scraping a small portion of the matrix material off the composite material and analysing it in the analysis instrument. First of all, the content of inorganic, noncombustible materials in a portion of the sample taken is determined according to the standard DIN EN ISO 1172 Method A.

In a further embodiment of the composite material according to the invention, the carbon content of the matrix present bound within isocyanurate groups, based on the total carbon content of the polymer matrix, is at least 8%, preferably at least 10%, more preferably at least 12%, greater than 15%, greater than 17% and greater than 19% or greater than 20% and most preferably greater than 23% carbon.

The carbon content bound within isocyanurate groups can be calculated, for example, from the integrals of proton-decoupled $^{13}C$ NMR spectra (MAS NMR, solid-state NMR), since the carbon atoms give characteristic signals in accordance with their bonding, and relate to the sum total of all carbon signals present.

In a further preferred embodiment, the total concentration of urethanes, allophanates, alcohols, amines, thiols, thiourethanes, thioallophanates and biurets in the resin of the composite material, based on the polyisocyanate composition A used, is between 0.1% and 20% by weight.

In a further embodiment of the invention, the ratio of the sum total of all carbon atoms bound within isocyanurate and iminooxadiazinedione groups and the sum total of all carbon atoms bound within urethanes, allophanates, thiols, thiourethanes, thioallophanates and biurets in the polyisocyanate composition A used is between 500 and 1, preferably between 300 and 1, more preferably between 100 and 1, especially between 50 and 1 and most preferably between 25 and 1.

The proportions of uretdione, urethane, isocyanurate, allophanate, biuret, iminooxadiazinedione and/or oxadiazinetrione structures in the polyisocyanate composition A can be calculated, for example, from the integrals of proton-decoupled $^{13}C$ NMR spectra, since the oligomeric structures mentioned give characteristic signals. They each relate to the sum total of uretdione, urethane, isocyanurate, allophanate, biuret, iminooxadiazinedione and/or oxadiazinetrione structures present in the polyisocyanate composition A.

In a further embodiment of the invention, the total concentration of urethanes, allophanates, alcohols, amines, thiols, thiourethanes, thioallophanates, ureas and biurets, based on the cured polymer matrix of the composite material A according to the invention, is between 20% by weight and 0.1% by weight, preferably between 10% by weight and 0.1% by weight and especially between 5% by weight and 0.1% by weight.

In a further embodiment of the invention, the ratio of the sum total of all carbon atoms bound within isocyanurate and iminooxadiazinedione groups and the sum total of all carbon atoms bound within urethanes, allophanates, thiols, thiourethanes, thioallophanates, ureas and biurets in the cured polymer matrix of the composite material according to the invention is between 500 and 1, preferably between 400 and 1, more preferably between 300 and 1, especially between 200 and 1 and most preferably between 100 and 1.

The carbon content bound within isocyanurate groups and iminooxadiazinedione groups and within urethanes, allophanates, thiols, thiourethanes, thioallophanates, ureas and biurets can be calculated, for example, from the integrals of proton-decoupled $^{13}C$ NMR spectra (MAS NMR, solid-state NMR), since the carbon atoms give characteristic signals in accordance with their bonding.

In a preferred embodiment of the present invention, the composite material according to the invention is obtained by crosslinking of the polyisocyanate composition A with a crosslinking catalyst B selected from the group consisting of quaternary ammonium salts, phosphonium salts, basic metal, alkali metal and alkaline earth metal compounds.

In a further preferred embodiment of the present invention, the content of the alkali metal or alkaline earth metal or of the corresponding ions in the portion of the matrix formed from the polyisocyanate composition A is at least 0.00025% by weight, more preferably at least 0.001% by weight and most preferably at least 0.01% by weight, based on the total weight of the polyisocyanate compound A or the polymer matrix formed therefrom.

In a particularly preferred embodiment, the portion of the matrix formed from the polyisocyanate composition A contains a proportion by weight of potassium ions and sodium ions, especially potassium ions, of 0.00025% to 3% by weight, preferably from 0.001% to 1% by weight and more preferably from 0.01% to 0.5% by weight.

Metal contents are preferably determined as follows: A few milligrams to grams of the polymer matrix are carefully scraped off the composite polyisocyanurate material, the sample is divided and, first of all, the content of inorganic, noncombustible materials in a portion is determined in accordance with the standard DIN EN ISO 1172 Method A. Thereafter, the residue is taken up with nitric acid and the metal content of the nitric acid solution is determined by means of atomic absorption spectroscopy or atomic emission spectroscopy AES. The content of metal ions in the polymer matrix can be determined from difference measurement.

In a further preferred embodiment, the portion of the matrix formed from the polyisocyanate composition A contains a proportion by weight of stearate salts as defined above of at least 0.001% by weight, preferably >0.01% by weight, more preferably >0.1% by weight and most preferably >0.25% by weight, based on the total weight thereof.

In a further particularly preferred embodiment, the portion of the matrix formed from the polyisocyanate composition A contains a proportion by weight of zinc or calcium ions as defined above of at least 0.0005% by weight, preferably >0.005% by weight, more preferably >0.05% by weight and most preferably >0.2% by weight, based on the total weight thereof.

Composite materials are frequently high-performance materials specifically matched to the application. By appropriate fibre orientation in the composite material and suitable choice of the polymer matrix, it is even possible to optimize the properties as a function of the direction of stress (anisotropy). This is an entirely desirable effect, since it is possible in this way to develop very lightweight materials in particular (lightweight construction). Consequently, the composite material according to the invention is preferably anisotropic in respect of at least one property. This property is preferably selected from the group consisting of thermal conductivity, electrical conductivity, propagation of sound within the material, tensile modulus, flexural modulus, flexural stress, coefficient of thermal expansion and interlaminar shear strength.

For composite materials, the mechanical properties in particular, for example tensile modulus or flexural modulus and interlaminar shear strength, are of major significance, but shape-determining properties such as thermal changes in length or volume also play a major role in practice. Consequently, the composite material according to the invention is more preferably anisotropic with respect to at least one property selected from the group consisting of tensile modulus, flexural modulus, thermal change in length and interlaminar shear strength. The anisotropy here is preferably manifested in that one or more of the aforementioned properties is more marked in axial direction than in transverse direction. "Axial direction" is understood in this application as the dimension of the workpiece to which the majority of the fibres of the fibrous filler C lie parallel.

In the case of profiles, for example, which are themselves effectively one-dimensional components, such properties are particularly sought-after and valuable. Frequently, tensile stresses or compressive stresses are required in axial direction in particular, whereas the values for most applications can be very much lower in transverse direction. Therefore, the provision of composite materials with anisotropic properties, especially of profiles and other effectively one- or two-dimensional components, for lightweight construction is very desirable.

The composite material according to the invention, in axial direction, has a tensile modulus of at least 30 GPa, preferably at least 35 GPa, at least 40 GPa, at least 45 GPa and especially 50 GPa, and most preferably at least 55 GPa. The tensile modulus can be determined in accordance with the standard DIN EN ISO 527.

The composite material according to the invention, in axial direction, has a flexural modulus of at least 30 GPa, preferably at least 35 GPa, at least 40 GPa, at least 45 GPa and especially 50 GPa, and most preferably at least 55 GPa.

The ratio between axial flexural modulus and transverse flexural modulus is greater than 2, preferably greater than 2.5, greater than 3, greater than 3.5, greater than 4 and more preferably greater than 4.5.

The ratio between maximum flexural modulus and minimum flexural modulus is greater than 2, preferably greater than 2.5, greater than 3, greater than 3.5, greater than 4 and more preferably greater than 4.5.

The composite material according to the invention exhibits an axial flexural stress of at least 300 MPa, preferably at least 500 MPa, at least 700 MPa, at least 900 MPa and especially 1000 MPa, and most preferably at least 1200 MPa.

The ratio between axial flexural strength and transverse flexural stress in the composite material according to the invention is greater than 4, preferably greater than 6, greater than 8, greater than 10 or greater than 15 and more preferably greater than 20.

The flexural modulus or flexural stress can be determined in composite materials according to the standard DIN EN ISO 14125.

The linear coefficient of thermal expansion of the composite material according to the invention, measured in axial direction, is less than 0.000015/K, preferably less than 0.000010/K, less than 0.000009/K, less than 0.000008 or less than 0.000006 /K and more preferably less than 0.000005/K.

The linear coefficient of thermal expansion of the composite material according to the invention, measured in transverse direction, is greater than 0.000015/K, preferably greater than 0.000020/K, greater than 0.000025/K, greater than 0.000030 or greater than 0.000035/K and more preferably greater than 0.000040/K.

The quotient of linear coefficients of thermal expansion measured in the axial and transverse directions (axial divided by transverse) of the composite material according to the invention is less than 1, preferably less than 0.5, less than 0.4, less than 0.3 or less than 0.2 and more preferably less than 0.15.

The linear coefficient of thermal expansion is determined in accordance with the standard DIN EN ISO 53752. All values are given for a temperature of 20° C.

The interlaminar shear strength of the composite material according to the invention, measured in axial direction, is at least 30 MPa, preferably at least 40 MPa, more preferably 45 MPa or 50 MPa, and most preferably greater than 55 MPa.

The ratio between axial interlaminar shear strength of the composite material according to the invention and transverse interlaminar shear strength is greater than 2, preferably greater than 3, greater than 4, greater than 4.5 or greater than 5, and more preferably greater than 6.

The interlaminar shear strength (ILSS) is determined in accordance with the standard DIN EN ISO 14130.

The density of the material is of crucial significance for many applications, especially in the case of those in the lightweight construction sector. The substitution of heavy metal components for lighter construction materials is an important constituent. Frequently, specific values such as the specific tensile or flexural modulus are also used. This involves dividing the mechanical data by the density of the material.

In one embodiment of the composite material according to the invention, the density of the composite material is less than 3 kg/l, preferably less than 2.5 kg/l, especially less than 2.3 kg/l and more preferably less than 2.2 kg/l. The density of the material can be determined in accordance with the standard DIN EN ISO 1183-1.

In a particular embodiment of the composite material according to the invention, the specific tensile modulus of the composite material is greater than 10 GPa*L/kg, preferably greater than 15 GPa*L/kg, especially greater than 20 GPa*L/kg and more preferably greater than 25 GPa*L/kg.

For the establishment of specific properties, for example a smooth surface, a particular colour, a high thermal or light stability, or on account of better processibility, the composite material according to the invention comprises additives D. The content of additives D, based on the total content of the polymer matrix of the composite material, is between 20% by weight and 0.1% by weight, preferably between 15% by weight and 0.1% by weight, more preferably between 5% by weight and 0.1% by weight and most preferably between 3% by weight and 0.1% by weight.

In a further embodiment of the composite material according to the invention, the proportion of additives D is less than 25% by volume, based on the total volume of the composite material according to the invention. Particular preference is given to a proportion of additives D between 25% by volume and 0.001% by volume, based on the total volume of the composite material according to the invention.

Advantages

The process according to the invention allows the simple production of pultruded workpieces with an easy-to-use resin system having a long pot life. The workpieces thus obtained have good mechanical and anisotropic properties, and also a very high weathering resistance without complex aftertreatment, for example a coating operation.

The working examples which follow serve merely to illustrate the invention. They are not intended to restrict the scope of protection of the claims.

EXAMPLES

General Details:

All percentages, unless stated otherwise, are based on percent by weight (% by weight).

The ambient temperature of 23° C. at the time of conduct of the experiments is referred to as RT (room temperature).

The NCO functionality of the various raw materials was in each case determined by calculation or taken from the respective datasheet for the raw material.

Test Methods:

The methods detailed hereinafter for determining the relevant parameters were employed for performing/evaluating the examples and are also the methods for determining the parameters relevant in accordance with the invention in general.

Performance of the DMA Measurements

The DMA measurements were conducted according to standard DIN EN ISO 6721-1.

Performance of the Tensile Tests

The measurements relating to the tensile tests were conducted according to standard DIN EN ISO 527.

Performance of the Bending Tests

The measurements relating to the bending tests were conducted according to standard DIN EN ISO 14125.

Performance of the Charpy Impact Resistance

The measurements relating to the Charpy impact resistance were conducted according to standard DIN EN ISO 179.

p Performance of the Measurement of the Fibre Content

The fibre content of the samples was determined according to standard DIN EN ISO 1172 Method A.

Performance of the Measurement of the Density

The measurement of the density of the samples was determined according to standard DIN EN ISO 1183-1 Method A.

Determination of the Interlaminar Shear Force

The interlaminar shear tests were conducted according to standard DIN EN ISO 14130.

Determination of Weathering Resistance

The weathering tests were conducted in a Ci5000 from Atlas Material Testing Technology. The samples were irradiated with the xenon lamp from one side and the cycles were run in accordance with the standard SAE J 2527. At particular intervals, visual examinations were conducted for cracks, surface gloss and smoothness, appearance and change in colour. For comparison, a second sample was produced as well in each case, but was not weathered and instead kept in the dark at room temperature and 40% to 70% relative humidity and utilized as reference.

For the UV tests, a QUV Weathering Tester from Q-Lab was used. The measurements were conducted in accordance with the standard DIN EN ISO 11507 with UV-A (340 nm) or UV-B (313 nm). At particular intervals, visual examinations were conducted for cracks, surface gloss and smoothness, appearance and change in colour. For comparison, a second sample was produced as well in each case, but was not weathered and instead kept in the dark at room temperature and 40% to 70% relative humidity and utilized as reference.

Determination of Pot Life

The viscosity of a small amount of the reactive resin material including the added catalyst was measured at 23° C. with a Physica MCR 51 from Anton Paar (plate/plate; shear rate 1 $s^{-1}$). The pot life was the time taken for the starting viscosity of the sample after finishing of the mixing process to triple.

Starting Compound

Desmodur® N 3600 is an HDI trimer (NCO functionality >3) with an NCO content of 23.0% by weight from Covestro AG. The viscosity is about 1200 mPas at 23° C. (DIN EN ISO 3219/A.3).

Desmodur® ECO N 7300 is a PDI trimer (NCO functionality >3) with an NCO content of 21.5% by weight from Covestro AG. The viscosity is about 9500 mPas at 23° C. (DIN EN ISO 3219/A.3).

Desmodur® XP 2489 is a mixture of HDI and IPDI oligomers (NCO functionality >3) with an NCO content of 21.0% by weight from Covestro AG. The viscosity is about 22 500 mPas at 23° C. (DIN EN ISO 3219/A.3).

Baydur® PUL 20PL05 is a mixture of polyols and auxiliaries from Covestro AG and is used for production of glass fibre-containing profiles composed of polyurethane in the pultrusion process. The viscosity is about 1600 mPas at 20° C. (DIN 53019).

Desmodur® PUL 10PL01 is a mixture of diphenylmethane 4,4'-diisocyanate (MDI) with isomers and higher-functionality homologs having an NCO content of about 31% by weight from Covestro AG and is used for production of glass fibre-containing profiles composed of polyurethane in the pultrusion process. The viscosity is 160-240 mPas at 25° C. (2011-0248603-94).

ATLAC® 430 is an epoxy-bisphenol A vinyl ester dissolved in styrene from DSM Coating Resins. Socal® 322 is a calcium carbonate powder from Solvay.

Dibutyltin dilaurate (DBTL) was sourced with a purity of >99% by weight from ACROS under the Tinstab® BL277 name.

Peroxan® BCC, Peroxan® PO and Peroxan® PB are peroxidic free-radical initiators from PERGAN GmbH.

Polyethylene glycol 400 was sourced with a purity of >99% by weight from ACROS. Potassium acetate was sourced with a purity of >99% by weight from ACROS.

The INT—1940 RTM separating agent was acquired from Axel Plastics Research Laboratories, INC. and, according to the datasheet, is a mixture of organic fatty acids and esters.

The INT—672 separating agent was acquired from Munch Chemie and, according to the datasheet, is a mixture of organic fatty acid derivatives.

The MI 8000 separating agent was acquired from Munch Chemie and, according to the datasheet, comprises a mixture of phosphoric esters, phosphorous esters and silicone-free further polymers.

The Additive 7000 separating agent was acquired from Munch Chemie and, according to the datasheet, is a silicone-free mixture of various polymers.

The INT—4151 separating agent was acquired from Munch Chemie and, according to the datasheet, is a silicone-free mixture of various polymers.

The INT—1324B separating agent was acquired from Axel Plastics Research Laboratories, INC. and, according to the datasheet, is a mixture of organic fatty acids, fatty acid esters and surface-active substances.

The Loxiol G 71 S separating agent was acquired from Emery Oleochemicals Group and, according to the datasheet, is a mixture of high molecular weight, multifunctional organic fatty acid esters.

The Silsurf C 50-1 separating agent was acquired from Siltech Corporation and, according to the datasheet, is a mixture of silicone polyethers and polydimethylsiloxane copolymers.

The Siltech P-103b separating agent was acquired from Siltech Corporation and, according to the datasheet, is a mixture of silicone polyethers and polydimethylsiloxane copolymers.

The Baysilone OF OH 702 E separating agent was acquired from Momentive and, according to the datasheet, is essentially organofunctionalized polydimethylsiloxanes such as octamethylcyclotetrasiloxane.

The zinc stearate and calcium stearate separating agents were acquired from SysKem Chemie GmbH.

The glass fibre was glass fibre bundles with standard size for UP, VE and epoxy resins with the product name 'Advantex 399' with 4800 tex from 3B-fibreglass. According to the datasheet, the glass fibres have a diameter of 24 micrometres, are boron-free and consist of E-CR glass. The tensile modulus is 81-83 GPa, the tensile strength 2200-2400 MPa and the density 2.62 g/cm$^3$.

Preparation of the Trimerization Catalyst

Potassium acetate (50.0 g) was stirred in the PEG 400 (950.0 g) at RT until all of it had dissolved. In this way, a 5% by weight solution of potassium acetate in PEG 400 was obtained and was used as catalyst without further treatment.

Preparation of the Resin Mixture

The isocyanate was initially charged in an open vessel at room temperature and stirred by means of a Dispermat® and dissolver disc at 100 revolutions per minute (rpm). Subsequently, first the separating agent and then the catalyst were added, the stirrer speed was increased to 300 rpm and the whole mixture was stirred for a further 10 min, so as to form a homogeneous mixture. This mixture was used without further treatment for the pultrusion.

Performance of the Pultrusion Tests

For performance of the pultrusion tests, a Pultrex Px 500-10 t system from Pultrex was used. The fibre bundles were in rolls on the rack and were first pulled by means of a fibre presort/orientation (perforated plate), and were then impregnated with resin at room temperature by means of an open dipping bath with deflector and strippers, or in an injection box, and then pulled into the heated mould (profile block). The mould had a length of 1000 mm, over which there were distributed 4 successively connected heating zones of equal size (H1 to H4, H1 at the glass fibre intake). This was followed by an air-cooled cooling zone for 5 m, followed by the two pullers. These worked with an appropriate offset, such that there was a continuous tensile force on the profile which transported the profile in the direction of the saw which followed after the pullers and cut the profile to the desired length. The profile cross section was a rectangle with the dimensions 120 mm×3 mm. In the case of use of a dipping bath for wetting of the fibres, the excess resin stripped off was returned to the bath and reused.

INVENTIVE EXAMPLES FOR THE PRODUCTION OF THE COMPOSITE POLVISOCVANURATE CATERIALS

Inventive Example 1

A resin mixture composed of Desmodur N 3600 (1.86 kg), catalyst mixture (0.08 kg) and INT-1940RTM demoulding agent (0.06 kg) was prepared as described above. The glass fibre bundles (126 rovings) were oriented and guided into the injection box, which was connected to the mould in a fixed manner and was filled with the resin mixture via a window opening on the top side of the box. The glass fibres that had thus been impregnated with resin were pulled directly into the heated mould. The temperature zones were H1=180° C., H2=220° C., H3=200° C. and H4=160° C. The pulling speed was 0.3 m/min. The pull-off forces were 4 t. 4 m of profile were produced. The pot life of the resin mixture was more than 4 hours. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 2

A resin mixture composed of Desmodur N 3600 (0.93 kg), Desmodur XP 2489 (0.93 kg), catalyst mixture (0.08 kg), DBTL (0.0004 kg) and INT-1940RTM demoulding agent (0.06 kg) was prepared as described above. The glass fibre bundles (126 rovings) were oriented and guided into the injection box, which was connected to the mould in a fixed manner and was filled with the resin mixture via a window opening on the top side of the box. The glass fibres that had thus been impregnated with resin were pulled immediately into the heated mould. The temperature zones were H1=190° C., H2=220° C., H3=200° C. and H4=160° C. The pulling speed was 0.3 m/min. The pull-off forces were 1-3.5 t. 5 m of profile were produced. The pot life of the resin mixture was more than 4 hours. In the weathering test according to SAE J 2527, after 5000 hours, no changes in the surface or colour were noted on visual inspection. In the weathering test with UV irradiation (UV-A or UV-B), after 3000 hours, no changes in the surface or colour were noted on visual inspection. The further test results are compiled in Table 1.

Inventive Example 3

A resin mixture composed of Desmodur ECO N 7300 (1.86 kg), catalyst mixture (0.08 kg) and INT-1940RTM demoulding agent (0.06 kg) was prepared as described above. The glass fibre bundles (133 rovings) were oriented and guided into the injection box, which was connected to the mould in a fixed manner and was filled with the resin mixture via a window opening on the top side of the box. The glass fibres that had thus been impregnated with resin were pulled directly into the heated mould. The temperature zones were H1=180° C., H2=220° C., H3=200° C. and H4=160° C. The pulling speed was 0.3 m/min and the tensile forces were 0.9 t. 5 m of profile were produced. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 4

A resin mixture composed of Desmodur N 3600 (2.887 kg), catalyst mixture (10% by weight of KOAc in PEG 400; 0.060 kg) and INT-1940RTM demoulding agent (0.045 kg) and also zinc stearate (0.008 kg) was prepared as described above. The glass fibre bundles (128 rovings) were oriented and guided into the injection box, which was connected to the mould in a fixed manner and was filled with the resin mixture via a window opening on the top side of the box. The glass fibres that had thus been impregnated with resin were pulled directly into the heated mould. The temperature zones were H1=180° C., H2=220° C., H3=200° C. and H4=180° C. The pulling speed was 0.5 m/min and the tensile forces were 0.2-0.8 t. 10 m of profile were produced. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 5

A resin mixture composed of Desmodur N 3600 (18.70 kg), catalyst mixture (0.80 kg) and INT-1940RTM demoulding agent (0.40 kg) and also zinc stearate (0.1 kg) was prepared as described above. The glass fibre bundles (128 rovings) were oriented and guided by means of a deflection through an open impregnation bath. The bath temperature was about 25° C. The glass fibres that had thus been impregnated with resin were pulled directly into the heated mould. The temperature zones were H1=180° C., H2=220° C., H3=200° C. and H4=180° C. The pulling speed was 0.5 m/min and the tensile forces were 0.2-0.6 t. 153 m of profile were produced. Excess reactive resin mixture that had been stripped off was recycled continuously into the impregnation bath via a channel and used. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 6

A resin mixture composed of Desmodur N 3600 (2.805 kg), catalyst mixture (6.7% by weight of KOAc in PEG 400; 0.180 kg) and INT-1940RTM demoulding agent (0.060 kg) and also calcium stearate (0.015 kg) was prepared as described above. The glass fibre bundles (132 rovings) were oriented and guided into the injection box, which was connected to the mould in a fixed manner and was filled with the resin mixture via a window opening on the top side of the box. The glass fibres that had thus been impregnated with resin were pulled directly into the heated mould. The temperature zones were H1=180° C., H2=220° C., H3=200° C. and H4=200° C. The pulling speed was 0.4 m/min and the tensile forces were 0.3 t. 15 m of profile were produced. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 7

A resin mixture composed of Desmodur N 3600 (2.670 kg), catalyst mixture (0.120 kg), calcium carbonate (0.150 kg) and INT-1940RTM demoulding agent (0.060 kg) and also zinc stearate (0.015 kg) was prepared as described above. The glass fibre bundles (128 rovings) were oriented and guided into the injection box, which was connected to the mould in a fixed manner and was filled with the resin mixture via a window opening on the top side of the box. The glass fibres that had thus been impregnated with resin were pulled directly into the heated mould. The temperature zones were H1=180° C., H2=220° C., H3=200° C. and H4=160° C. The pulling speed was 0.5 m/min and the tensile forces were 0.2 t. 11 m of profile were produced. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 8

A resin mixture composed of Desmodur N 3600 (2.830 kg), catalyst mixture (0.120 kg) and Baysilone OF OH 702 E demoulding agent (0.030 kg) and also zinc stearate (0.015 kg) was prepared as described above. The glass fibre bundles (128 rovings) were oriented and guided into the injection box, which was connected to the mould in a fixed manner and was filled with the resin mixture via a window opening on the top side of the box. The glass fibres that had thus been impregnated with resin were pulled directly into the heated mould. The temperature zones were H1=180° C., H2=220° C., H3=200° C. and H4=160° C. The pulling speed was 0.5 m/min and the tensile forces were 0.4-0.7 t. 11 m of profile were produced. In the weathering test according to SAE J 2527, after 5000 hours, no changes in the surface or colour were noted on visual inspection. In the weathering test with UV irradiation, after 3000 hours, no changes in the surface or colour were noted on visual inspection. The further test results are compiled in Table 1.

Inventive Example 9

Inventive Example 9 was conducted entirely analogously to Inventive Example 8, except that the Baysilone OF OH 702 E demoulding agent was exchanged for INT-1324B (0.060 kg). The pulling speed was 0.5 m/min and the tensile forces were 0.6 t. 10 m of profile were produced.

Inventive Example 10

Inventive Example 10 was conducted entirely analogously to Inventive Example 8, except that the Baysilone OF OH 702 E demoulding agent was exchanged for INT-4151 (0.060 kg). The pulling speed was 0.5 m/min and the tensile forces were 0.6 t. 7 m of profile were produced.

Inventive Example 11

Inventive Example 11 was conducted entirely analogously to Inventive Example 8, except that the Baysilone OF OH 702 E demoulding agent was exchanged for Loxiol G71 S (0.060 kg). The pulling speed was 0.5 m/min and the tensile forces were 0.7-1.4 t. 11 m of profile were produced.

Inventive Example 12

Inventive Example 12 was conducted entirely analogously to Inventive Example 8, except that the Baysilone OF OH 702 E demoulding agent was exchanged for INT-672 (0.060 kg). The pulling speed was 0.5 m/min and the tensile forces were 0.4 t. 10 m of profile were produced.

Inventive Example 13

Inventive Example 13 was conducted entirely analogously to Inventive Example 8, except that the Baysilone OF OH 702 E demoulding agent was exchanged for MI 8000 (0.060 kg). The pulling speed was 0.5 m/min and the tensile forces were 0.4 t. 11 m of profile were produced.

Inventive Example 14

Inventive Example 14 was conducted entirely analogously to Inventive Example 8, except that the Baysilone OF OH 702 E demoulding agent was exchanged for Additive 7000 (0.060 kg). The pulling speed was 0.5 m/min and the tensile forces were 0.4 t. 10 m of profile were produced.

Inventive Example 15

Inventive Example 15 was conducted entirely analogously to Inventive Example 8, except that the Baysilone OF OH 702 E demoulding agent was exchanged for Silsurf C 50-1 (0.030 kg). The pulling speed was 0.5 m/min and the tensile forces were 0.9-1.5 t. 13 m of profile were produced.

Inventive Example 16

Inventive Example 16 was conducted entirely analogously to Inventive Example 8, except that the Baysilone OF OH 702 E demoulding agent was exchanged for Siltech P103B (0.030 kg). The pulling speed was 0.5 m/min and the tensile forces were 0.7 t. 12 m of profile were produced.

NONINVENTIVE EXAMPLES

Comparative Example 1

Polyol component: Baydur® PUL 20PL05 was admixed with 4% by weight of demoulding agent and homogenized for 5 min at 100 rpm with the Dispermat® and dissolver disc. Desmodur® PUL 10PL01 and the polyol component were conveyed directly into the injection box via a static mixer with an electric motor by means of pumps in the appropriate ratio (OH groups to NCO groups=1), such that the amount of partly mixed resin was consumed immediately in the pultrusion operation. Glass fibre bundles (126 rovings) were oriented and pulled through the injection box, where the impregnation with the resin was effected, into the heated mould. The temperature zones were H1=140° C., H2=160° C., H3=160° C. and H4=140° C. The pulling speed was 0.6 m/min. 20 m of profile were produced. The pot life of the reactive resin mixture is less than 1 hour. The weathering test according to SAE J 2527 was stopped after 1000 hours, the UV-A test after 4000 hours and the UV-B test after 2000 hours. On visual inspection, it was found that the glass fibres were exposed on the surface in each case and the resin matrix was degraded. The further test results are compiled in Table 2.

Comparative Example 2

A resin mixture was produced from ATLAC® 430 (20.0 kg), Socal® 322 (6.0 kg), Pergan® BCC (0.12 kg), Pergan® PO (0.08 kg), Pergan® PB (0.06 kg) and demoulding agent (0.25 kg) with the aid of the Dispermat® and dissolver disc (300 rpm). The glass fibre bundles (109 rovings) were oriented and impregnated with the resin by means of an open dipping bath which had a deflector and stripper, and pulled into the heated mould. The temperature zones were H1=140° C., H2=140° C., H3=140° C. and H4=140° C. The pulling speed was 0.5 m/min and the tensile forces were 1.2 to 1.7 t. 40 m of profile were produced. The pot life of the resin mixture was more than 5 hours. The weathering test according to SAE J 2527 was stopped after 3000 hours. On visual inspection, it was found that the glass fibres were exposed on the surface and the resin matrix was degraded. The further test results are compiled in Table 2.

As is clearly apparent from the comparison between the inventive and noninventive examples, most of the mechanical values for the composite materials are similar or at least in the same order of magnitude. However, the noninventive examples exhibit poor weathering characteristics, where breakdown and degradation cause the glass fibres to come to the surface and destruction of the component. By contrast, the inventive examples were very much more weathering-resistant, such that components made from materials of this kind have a very much longer lifetime even under extreme weathering stresses.

TABLE 1

Inventive examples

| Experiment | | | Inventive Example 1 | Inventive Example 2 | Inventive Example 3 | Inventive Example 4 | Inventive Example 5 | Inventive Example 6 | Inventive Example 7 | Inventive Example 8 |
|---|---|---|---|---|---|---|---|---|---|---|
| Tensile test | DIN EN ISO 527 | | | | | | | | | |
| Tensile modulus | | GPa | 55 | 54.3 | 57.2 | 58.8 | n.d. | 60 | 51.3 | 55.6 |
| Tensile stress at yield | | MPa | not determined | 916 | 955 | 1039 | n.d. | 1068 | 917 | 971 |
| Elongation at break | | % | not determined | 1.87 | 2.29 | 1.9 | n.d. | 1.9 | 1.8 | 1.9 |
| Bending test | DIN EN ISO 14125 | | | | | | | | | |
| Flexural modulus (axial) | | GPa | 49.2 | 52.7 | 49.2 | 52.6 | 50.5 | 52.4 | 50.2 | 52 |
| Flexural stress (axial) | | MPa | 1137 | 1310 | 1232 | 1225 | 1230 | 1295 | 1190 | 1360 |
| Flexural elongation (axial) | | % | 2.37 | 2.58 | 2.6 | 2.45 | 2.6 | 2.55 | 2.49 | 2.72 |
| Flexural modulus (transv) | | GPa | 11.1 | 13.6 | 10.8 | 13.9 | 13.8 | 14.1 | 12.4 | 13.6 |
| Flexural stress (transv) | | MPa | 68.9 | 66 | 37.4 | 61.5 | 72.6 | 82.3 | 55.9 | 73.8 |
| Flexural elongation (transv) | | % | 0.73 | 0.55 | 0.39 | 0.5 | 0.6 | 0.68 | 0.52 | 0.61 |
| Charpy (axial) | DIN EN ISO 179 | | | | | | | | | |
| ak | | kJ/m$^2$ | 302 | 333 | 324 | 324 | 330 | 342 | 353 | 329 |
| W | | J | 9 | 10 | 10 | 9.6 | 9.8 | 10.2 | 10.6 | 10 |
| Filler content | DIN EN ISO 1172/A | wt % | 79 | 78 | 83 | 82 | 82 | 82 | 82 | 81 |
| Density | DIN EN ISO 1183-1 | g/cm$^3$ | 2.13 | 2.14 | 2.12 | 2.18 | n.d. | 2.17 | n.d. | n.d. |
| Coefficient of linear thermal expansion | DIN EN ISO 53752 | | | | | | | | | |
| axial | | 1e$^{-6}$/K | 6.7 | 5.8 | 4.7 | 6.5 | 5.5 | 6.3 | 5.2 | 7 |
| transverse | | 1e$^{-6}$/K | 32.7 | 26.9 | 40.5 | 26 | 28.1 | 25 | 29.7 | 32 |
| DMA (3-point bending test) | DIN EN ISO 6721-1 | | | | | | | | | |
| tangent δ | | ° C. | 105 | 129 | 112 | 102 | 101 | 101 | 100 | 107 |
| ILSS | DIN EN ISO 14130 | | | | | | | | | |
| axial | | MPa | 47 | 50.9 | 52.8 | 50 | 50 | 55.6 | 49.4 | 54.8 |
| transv | | MPa | 7.9 | 8.9 | 5.2 | 10.8 | 9 | 8.7 | 9.1 | 9 |

TABLE 2

Comparative tests

| Experiment | | | Comparative Example 1 | Comparative Example 2 |
|---|---|---|---|---|
| Tensile test | DIN EN ISO 527 | | | |
| Tensile modulus | | GPa | 55.4 | 50.8 |
| Tensile stress at yield | | MPa | 1013 | 870 |
| Elongation at break | | % | 1.94 | 1.9 |
| Bending test | DIN EN ISO 14125 | | | |
| Flexural modulus (axial) | | GPa | 52.6 | 47 |
| Flexural stress (axial) | | MPa | 1540 | 1220 |
| Flexural elongation (axial) | | % | 3 | 2.7 |
| Flexural modulus (transv) | | GPa | 15.2 | 13.5 |
| Flexural stress (transv) | | MPa | 72.7 | 57.6 |
| Flexural elongation (transv) | | % | 0.53 | 0.47 |
| Charpy (axial) | DIN EN ISO 179 | | | |
| ak | | kJ/m$^2$ | 324 | 309 |
| W | | J | 10.2 | 9.3 |
| Filler content | DIN EN ISO 1172/A | wt % | | 81 |
| Density | DIN EN ISO 1183-1 | g/cm$^3$ | 2.11 | |
| Coefficient of linear thermal expansion | DIN EN ISO 53752 | | | |
| axial | | 1e$^{-6}$/K | 5.3 | 5.5 |
| transverse | | 1e$^{-6}$/K | 28.3 | 20.5 |
| DMA (3-point bending test) | DIN EN ISO 6721-1 | | | |
| tangent δ | | ° C. | 117 | 111.5 |
| ILSS | DIN EN ISO 14130 | | | |
| axial | | MPa | 64.5 | 56 |
| transv | | MPa | 12.8 | 7.6 |

The invention claimed is:

1. Process for producing a composite polyisocyanurate material, comprising the steps of
    a) providing a reactive resin mixture comprising all compounds that react with each other during the process, the reactive resin mixture comprising:
        at least one reactive polyisocyanate composition A consisting of at least 50% by weight of one or more aliphatic isocyanates, and at least one crosslinking catalyst B,
    wherein the at least one crosslinking catalyst B comprises a trimerization catalyst;
    b) providing a fibrous filler C, the fibres of which have an aspect ratio of at least 1000,
    c) wetting the fibrous filler C with the reactive resin mixture from process step a), wherein the molar ratio of free isocyanate groups to the sum of hydroxyl, amino and thiol groups in the reactive resin mixture is at least 5.0:1.0,
    d) curing the resin-impregnated fibrous filler, to give a profile by means of one or more chemical reactions, the curing comprising at least 50% of the free isocyanate groups in the polyisocyanate composition A being crosslinked on the resin-impregnated fibrous filler to form isocyanurate structures and optionally at least one structure selected from the group consisting of uretdione, allophanate, biuret, iminooxadiazinedione, oxadiazinetrione, and combinations thereof, the curing continued until at most 10% of the free isocyanate groups from the reactive resin mixture remain.

2. The process according to claim 1, wherein the polyisocyanate composition A consists of at least 90% by weight of one or more aliphatic isocyanates.

3. The process according to claim 2, wherein the at least one aliphatic isocyanate is selected from the group consisting of 1,4-diisocyanatobutane, 1,5-diisocyanatopentane, 1,6-diisocyanatohexane, isophorone diisocyanate and 4,4'-diisocyanatodicyclohexylmethane.

4. The process according to claim 1, wherein the polyisocyanate composition A consists of at least 55% by weight of oligomeric polyisocyanates.

5. The process according to claim 1, wherein the polyisocyanate composition A has a mean isocyanate functionality of >1.0 to 6.0.

6. The process according to claim 1, wherein the fibrous filler is selected from the group consisting of glass fibres, basalt fibres, boron fibres, ceramic fibres, whiskers, silica fibres, metallic reinforcing fibres and mixtures thereof.

7. The process according to claim 1, wherein the molar ratio of free isocyanate groups to the sum of hydroxyl, amino and thiol groups in the reactive resin mixture is at least 10:1.0.

8. The process according to claim 1, wherein the crosslinking catalyst B is characterized in that the polyisocyanate composition A, after it has been added, has a pot life of at least 5 minutes at 23° C.

9. The process according to claim 1, wherein the trimerization catalyst comprises an alkali metal compound, an alkaline metal compound, a quaternary ammonium salt, or phosphonium salt.

10. The process according to claim 1, wherein the trimerization catalyst comprises a polyether, wherein the polyether comprises a polyethylene glycol.

11. The process according to claim 1, wherein the process is conducted at a temperature of above 180° C. within less than 10 minutes at least up to a conversion level at which only at most 20% of the isocyanate groups originally present in the polyisocyanate composition A are still present.

12. The process according to claim 1, wherein the trimerization catalyst comprises an alkali metal compound, an alkaline metal compound, a quaternary ammonium salt, or phosphonium salt dissolved in or at least suspended in a polyether.

13. The process according to claim 1, wherein in method step d) at least 50% of the free isocyanate groups in the polyisocyanate composition A are crosslinked on the resin-impregnated fibrous filler to give isocyanurate groups.

14. The process according to claim 1, wherein in method step d) at least 60% of the free isocyanate groups in the polyisocyanate composition A are crosslinked on the resin-impregnated fibrous filler to give isocyanurate structures and at least one structure selected from the group consisting of uretdione, allophanate, biuret, iminooxadiazinedione, oxadiazinetrione, and combinations thereof.

\* \* \* \* \*